(12) United States Patent
Usami

(10) Patent No.: US 6,887,403 B1
(45) Date of Patent: May 3, 2005

(54) INFORMATION RECORDING MEDIUM AND METHOD OF MANUFACTURING SAME

(75) Inventor: Yoshihisa Usami, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 417 days.

(21) Appl. No.: 09/709,512

(22) Filed: Nov. 13, 2000

(30) Foreign Application Priority Data

Nov. 10, 1999 (JP) .......................................... 11-319813

(51) Int. Cl.⁷ .............................................. B29D 11/00
(52) U.S. Cl. ..................................... 264/1.33; 425/810
(58) Field of Search ............................. 264/1.33, 1.7, 264/348, 2.6; 156/155, 245; 425/810, 574, 576; 414/222.01

(56) References Cited

U.S. PATENT DOCUMENTS

| | | | |
|---|---|---|---|
| 4,954,380 A | * | 9/1990 | Kanome et al. |
| 5,585,063 A | * | 12/1996 | Slater et al. |
| 5,612,068 A | | 3/1997 | Kempf et al. |
| 5,789,053 A | | 8/1998 | Asai |
| 5,858,414 A | * | 1/1999 | Hayashi et al. |
| 6,132,545 A | * | 10/2000 | Motokawa et al. |
| 6,197,477 B1 | * | 3/2001 | Satoh et al. |

FOREIGN PATENT DOCUMENTS

| | | | |
|---|---|---|---|
| DE | 198 09 349 A | 9/1999 | |
| JP | 2-300288 | 12/1990 | ........... C09K/15/20 |
| JP | 3-224793 | 10/1991 | ............ B41M/5/26 |
| JP | 4-146189 | 5/1992 | ............ B41M/5/26 |
| JP | 6-150371 | 5/1994 | ............ G11B/7/24 |
| JP | 6-187674 A | 7/1994 | |
| JP | 6-267116 A | 9/1994 | |
| JP | 9-120588 A | 5/1997 | |
| JP | 10-317590 A | 11/1998 | |
| WO | WO 99/24258 A1 | 5/1999 | |

OTHER PUBLICATIONS

Patent Abstract of Japan 06150371 May 31, 1994.
Patent Abstract of Japan 02300288 Dec. 12, 1990.
Patent Abstract of Japan 03224793 Oct. 03, 1991.
Patent Abstract of Japan 04146189 May 20, 1992.

* cited by examiner

*Primary Examiner*—Mathieu D. Vargot
(74) *Attorney, Agent, or Firm*—Sughrue Mion, PLLC

(57) ABSTRACT

Two substrates are simultaneously produced by an injection molding apparatus, and the injection-molded substrates are alternately arranged and cooled by a cooling apparatus. The cooling apparatus has a feed screw mechanism for feeding the alternately arranged substrates in one direction while cooling air is being applied to the substrates. An information recording medium which includes a substrate is manufactured on a production line having a single injection molding apparatus for simultaneously injection-molding two substrates and four dye solution coating machines for forming a dye recording layer for recording information on each of the substrates.

5 Claims, 17 Drawing Sheets

INFORMATION RECORDING MEDIUM AND METHOD OF MANUFACTURING SAME

BACKGROUND OF THE INVENTION

1. Field of the Invention

The present invention relates to an information recording medium having a substrate manufactured by injection molding, and a method of manufacturing such an information recording medium.

2. Description of the Related Art

Optical information recording mediums (optical disks) capable of recording information once with a laser beam include a write-once CD (so-called CD-R) and a DVD-R. These optical information recording mediums are advantageous in that they allow a smaller quantity of CDs to be supplied quickly to the market at a reasonable price than conventional CDs (compact disks), and there are growing demands for such optical information recording mediums in view of the recent widespread use of personal computers.

Typically, a CD-R-type information recording medium comprises a disk-shaped transparent substrate having a thickness of about 1.2 mm, a recording layer of an organic dye deposited on the substrate, a light reflecting layer of metal such as gold disposed on the recording layer, and a protective layer of resin disposed on the light reflecting layer. For details, see Japanese laid-open patent publication No. 6-150371, for example.

A DVD-R-type information recording medium comprises two disk-shaped transparent substrates each having a thickness of about 0.6 mm which are bonded to each other with their information recording surfaces facing each other. The DVD-R-type information recording medium can record a greater amount of information.

The substrates of these optical disks are generally made of polycarbonate or acrylic resin by injection molding or injection compression molding for better productivity.

Specifically, a stamper is disposed in a cavity defined between a fixed mold and a movable mold of a closed mold assembly of an injection molding machine, and a molten resin is injected into the cavity to produce a substrate which has tracking grooves and recesses and protrusions representing information such as address signals transferred to its surface from the stamper.

Usually, one or two substrates are manufactured in one injection molding cycle. Substrates which have been molded are removed from the mold and cooled. Specifically, the substrates are cooled by either being placed flatwise on respective rotary tables which having chucks for holding the substrates at central holes thereof, or being arranged vertically in a magazine.

For manufacturing CD-R-type information recording mediums, two substrates are simultaneously molded, and the molded substrates are cooled on independent lines. For manufacturing DVD-R-type information recording mediums, one of the two substrates to be bonded together is supplied from a stock of substrates.

According to the above process of manufacturing CD-R-type information recording mediums, since two substrates are simultaneously molded, and the molded substrates are cooled on independent lines, there is developed a temperature difference between the substrates that have been cooled on the independent lines. Therefore, the substrates tend to suffer warpage or swaying, and resulting in the development of a performance difference when films are grown thereon.

According to the above process of manufacturing DVD-R-type information recording mediums, there is developed a temperature difference between two bonded substrates, i.e., a substrate from the stock and an injection-molded substrate with a dye recording layer formed thereon, and hence the substrates tend to suffer warpage or swaying.

SUMMARY OF THE INVENTION

It is therefore an object of the present invention to provide an information recording medium having two injection-molded substrates whose temperatures are substantially constant and which are stable and free from mechanical fluctuations such as warpage and swaying.

According to an aspect of the present invention, there is provided an information recording medium comprising a substrate produced by injection molding, a dye recording layer disposed on the substrate for recording information therein, the substrate being selected from two substrates which are simultaneously injection-molded, alternately arranged, and then cooled.

According to another aspect of the present invention, there is provided a method of manufacturing an information recording medium having a substrate produced by injection molding, and a dye recording layer disposed on the substrate for recording information therein, comprising the steps of simultaneously injection-molding two substrates, alternately arranging the two substrates, and cooling the two substrates.

The two substrates which have been cooled are of the substantially same temperature, and hence are stable and free from mechanical fluctuations such as warpage and swaying.

A production line for manufacturing the information recording medium may have a single injection molding apparatus for simultaneously injection-molding the two substrates, and four dye solution coating machines for forming the dye recording layer on the substrate. The production line is thus simplified and takes up a reduced installation space.

The injection-molded substrates may be supported with surfaces thereof oriented substantially vertically on a feed screw mechanism, or flatwise on a rotary table. Alternatively, the injection-molded substrates may be supported with surfaces thereof oriented substantially vertically in a rotatable cylinder, or on a rotatable polygonal prism with outer facets thereof attracting the substrates, respectively.

According to still another aspect of the present invention, there is also provided a method of manufacturing an information recording medium, comprising the steps of simultaneously injection-molding two substrates, forming a dye recording layer on one of the two substrates, and thereafter, bonding the two substrates to each other. Therefore, the two substrates are of the substantially same temperature, and hence the information recording medium composed of those two substrates is stable and free from mechanical fluctuations such as warpage and swaying.

In the above method, the two substrates may be simultaneously injection-molded on a single injection molding apparatus, and four dye solution coating machines may be used on a production line to form the dye recording layer on the one of the substrates. Therefore, the production line is simplified and takes up a reduced installation space.

In the above method, the injection-molded substrates may be supported with surfaces thereof oriented substantially vertically on a feed screw mechanism The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
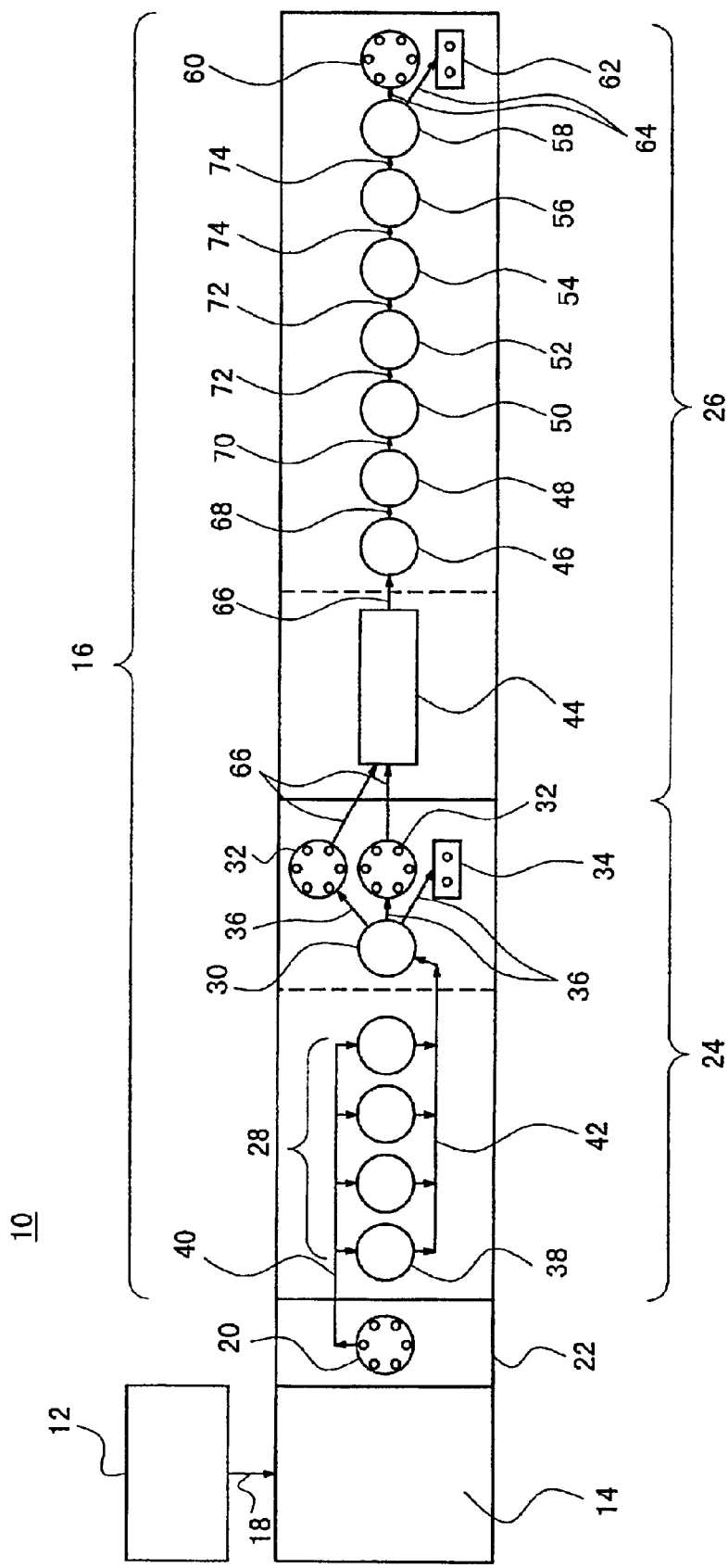
FIG. 1 is a schematic plan view of a production system for carrying out a method of manufacturing an information recording medium according to a first embodiment of the present invention.

As shown in FIG. 1, a production system 10 for carrying out a method of manufacturing an information recording medium according to a first embodiment of the present invention generally comprises an injection molding apparatus 12 for simultaneously producing two substrates 202 (see FIG. 10A) by injection molding, a cooling apparatus 14 for cooling the injection-molded substrates 202, and a production assembly 16 for producing an optical disk D from the cooled substrates 202.

The two substrates 202 that have simultaneously been produced by the injection molding apparatus 12 are delivered to the cooling apparatus 14 by an arm mechanism 18. The substrates 202 that have been cooled by the cooling apparatus 14 are stacked and stored on a stack pole 20 which is installed in a stack unit (stack pole rotary table) 22 in a front stage of the projection assembly 16.

The production assembly 16 comprises two, i.e., first and second, processing stations 24, 26. The first processing station 24 comprises a dye solution coating mechanism 28 for coating a dye solution to one principal surface of a substrate 202 and drying the coated dye solution to form a dye recording layer on the substrate 202, an inspecting mechanism 30 for inspecting the substrate and the dye recording layer for any defects and checking the thickness of the dye recording layer, and a sorting mechanism 36 for sorting the substrate 202 selectively to a stack pole 32 for normal substrates and a stack pole 34 for defective substrates depending on the inspected result from the inspecting mechanism 30. The dye solution coating mechanism 28 has four dye solution coating machines 38.

The first processing station 24 also has a first feed mechanism 40 for taking one at a time of the substrates 202 stacked on the stack pole 20 and feeding the substrate 202 to the dye solution coating mechanism 28, and a second feed mechanism 42 for feeding one at a time of coated substrates 202 to the inspecting mechanism 30.

The second processing station 26 comprises a drying furnace 44 for drying a substrate 202 in order to stabilize the light reflectance of the dye recording layer on the substrate 202, a sputtering mechanism 46 for forming, by sputtering, a light reflecting layer on the dye recording layer on the substrate 202 whose light reflectance has been stabilized by the drying furnace 44, an edge cleaning mechanism 48 for cleaning an peripheral edge of the substrate 202 on which the light reflecting layer has been formed by the sputtering mechanism 46, an UV-curable solution coating mechanism 50 for coating an UV-curable solution on the dye recording layer on the substrate 202 whose edge has been cleaned by the edge cleaning mechanism 48, and a spinning mechanism 52 for spinning the substrate 202 which has been coated with the UV-curable solution at a high speed to uniformize the coated thickness of the UV-curable solution.

The second processing station 26 also has an UV applying mechanism 54 for applying ultraviolet rays to the substrate 202 which has been coated with the UV-curable solution and spun to cure the coated UV-curable solution thereby to form a protective layer on the light reflecting layer on the substrate 202, a defect inspecting mechanism 56 for inspecting, for defects, the coated surface and the protective layer surface of the substrate 202 to which the ultraviolet rays have been applied, a characteristic inspecting mechanism 58 for inspecting signal characteristics due to grooves (recesses and protrusions) 200 formed in the substrate 202, and a sorting mechanism 64 for sorting the substrate 202 selectively to a stack pole 60 for normal substrates and a stack pole 62 for defective substrates depending on the inspected results from the defect inspecting mechanism 56 and the characteristic inspecting mechanism 58.

The second processing station 26 also includes a third feed mechanism 66 for feeding one at a time of the substrates 202 stacked on the stack pole 32 in the first processing station 24 to the drying furnace 44 and the sputtering mechanism 46, a fourth feed mechanism 68 for feeding the substrate 202 on which the light reflecting layer has been formed to the edge cleaning mechanism 48, a fifth feeding mechanism 70 for feeding the substrate 202 whose edge has been cleaned to the UV-curable solution coating mechanism 50, a sixth feeding mechanism 72 for feeding the substrate 202 which has been coated with the UV-curable solution to the spinning mechanism 52 and the UV applying mechanism 54, and a seventh feeding mechanism 74 for feeding the substrate 202 which has been exposed to ultraviolet rays to the defect inspecting mechanism 56 and the characteristic inspecting mechanism 58.

A process of simultaneously injection-molding two substrates 202 and a process of cooling injection-molded substrates 202 will be described below with reference to FIGS. 2 through 9.

Figure 2:
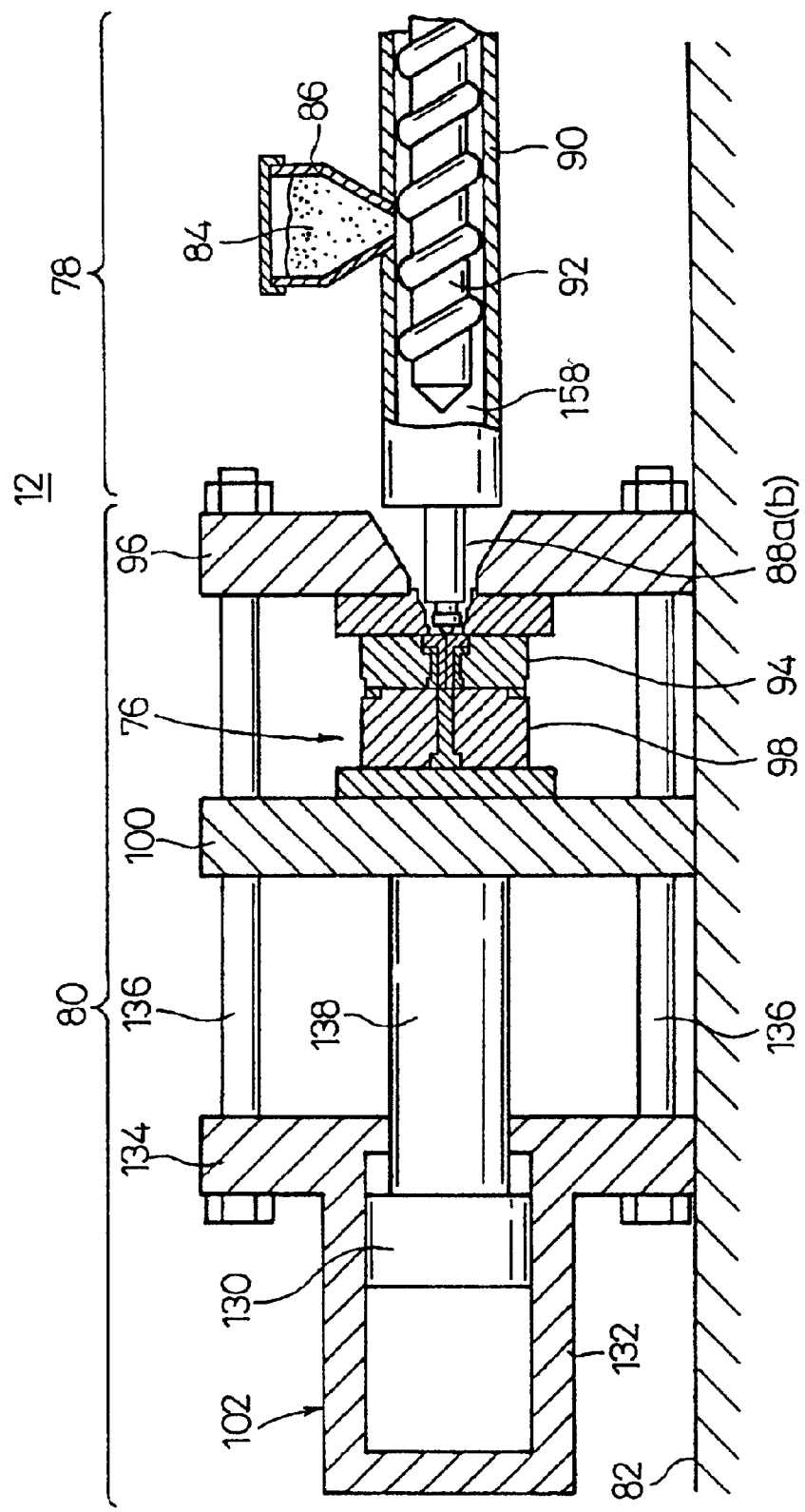
FIG. 2 is a vertical cross-sectional view of an injection molding apparatus used in an injection molding process in the method according to the first embodiment.
Figure 3:
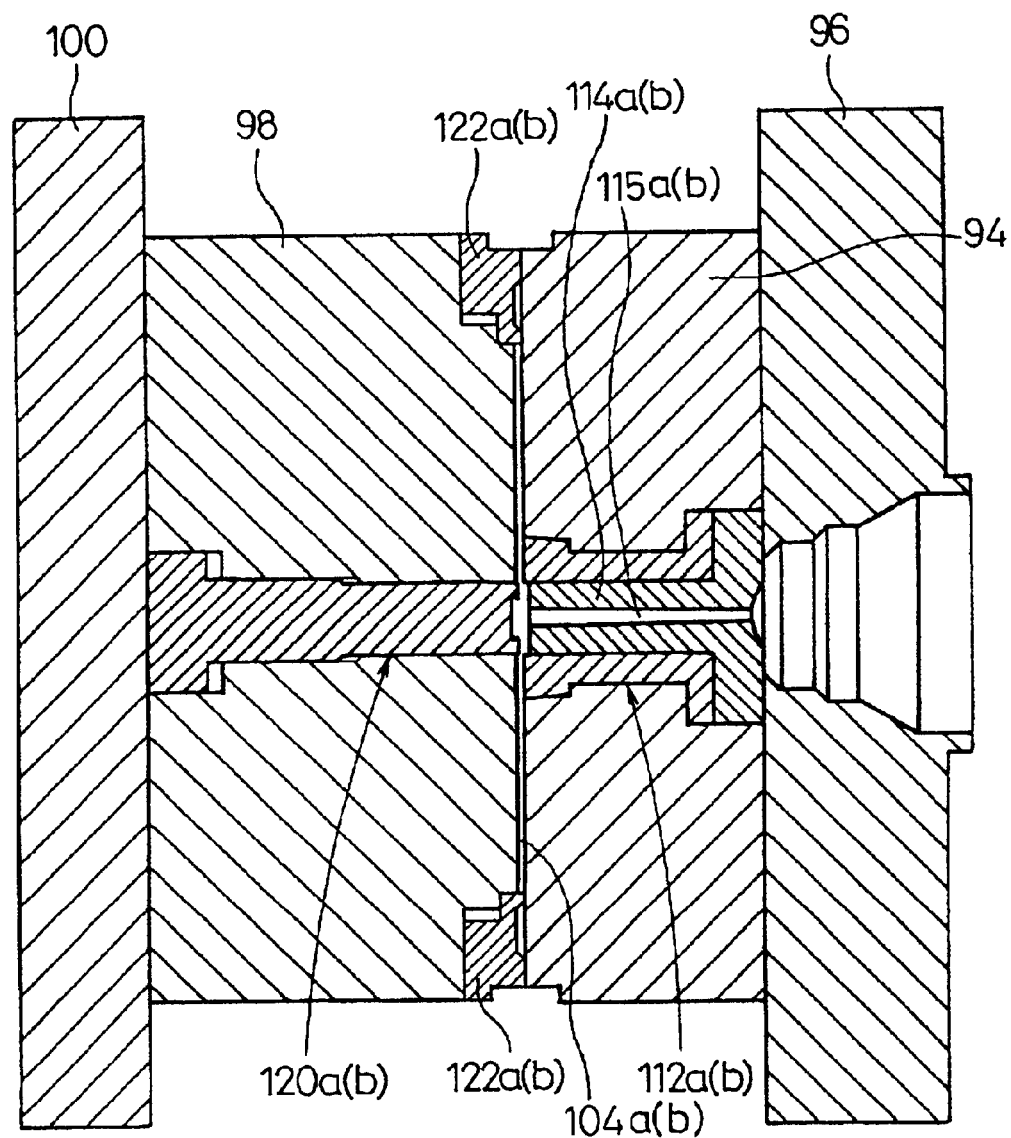
FIG. 3 is an enlarged vertical cross-sectional view of a mold assembly of the injection molding apparatus.
Figure 4:
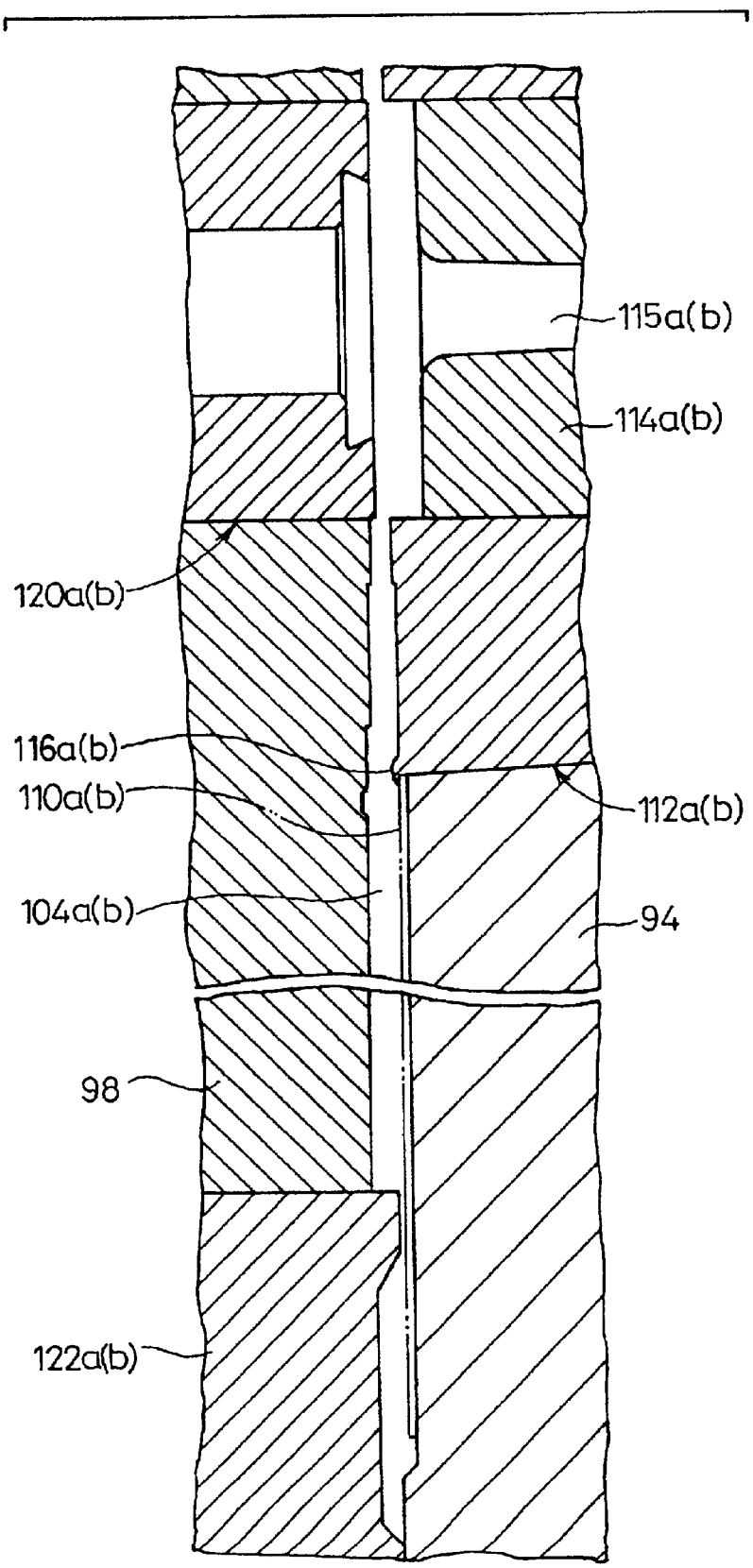
FIG. 4 is an enlarged vertical cross-sectional view of a region where a stamper is attached of the injection molding apparatus.
Figure 5:
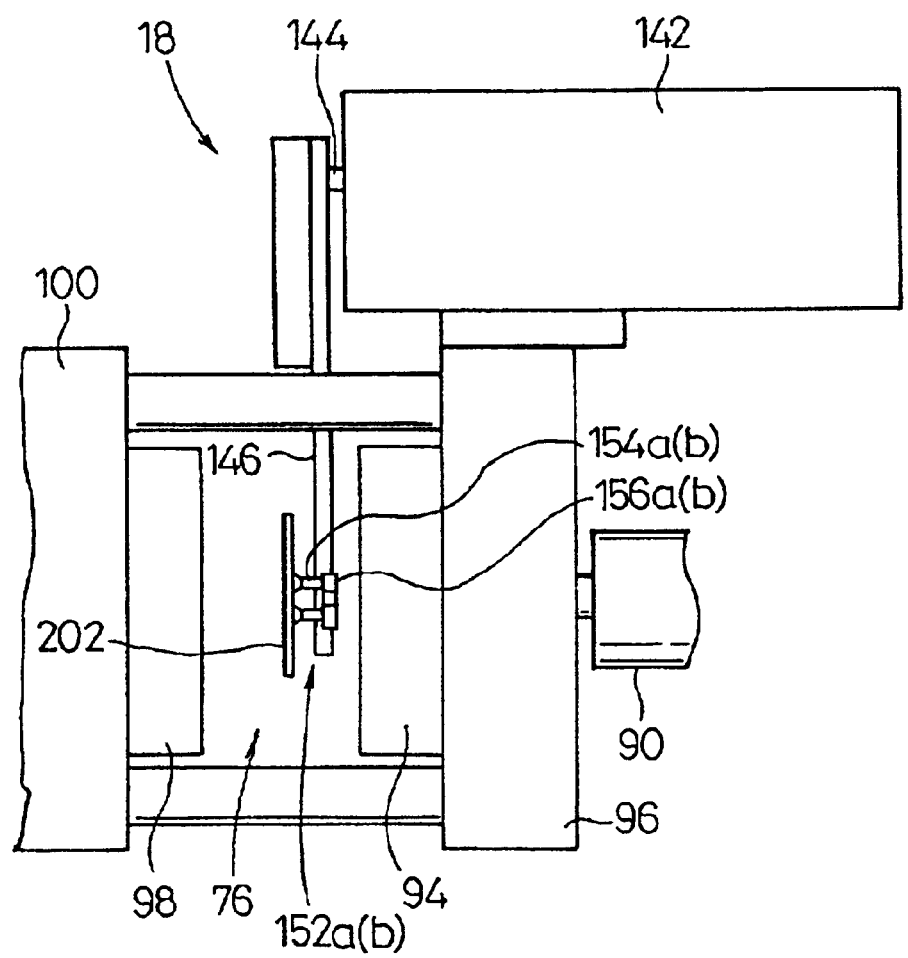
FIG. 5 is an elevational view of a substrate removal mechanism attached to the injection molding apparatus.
Figure 6:
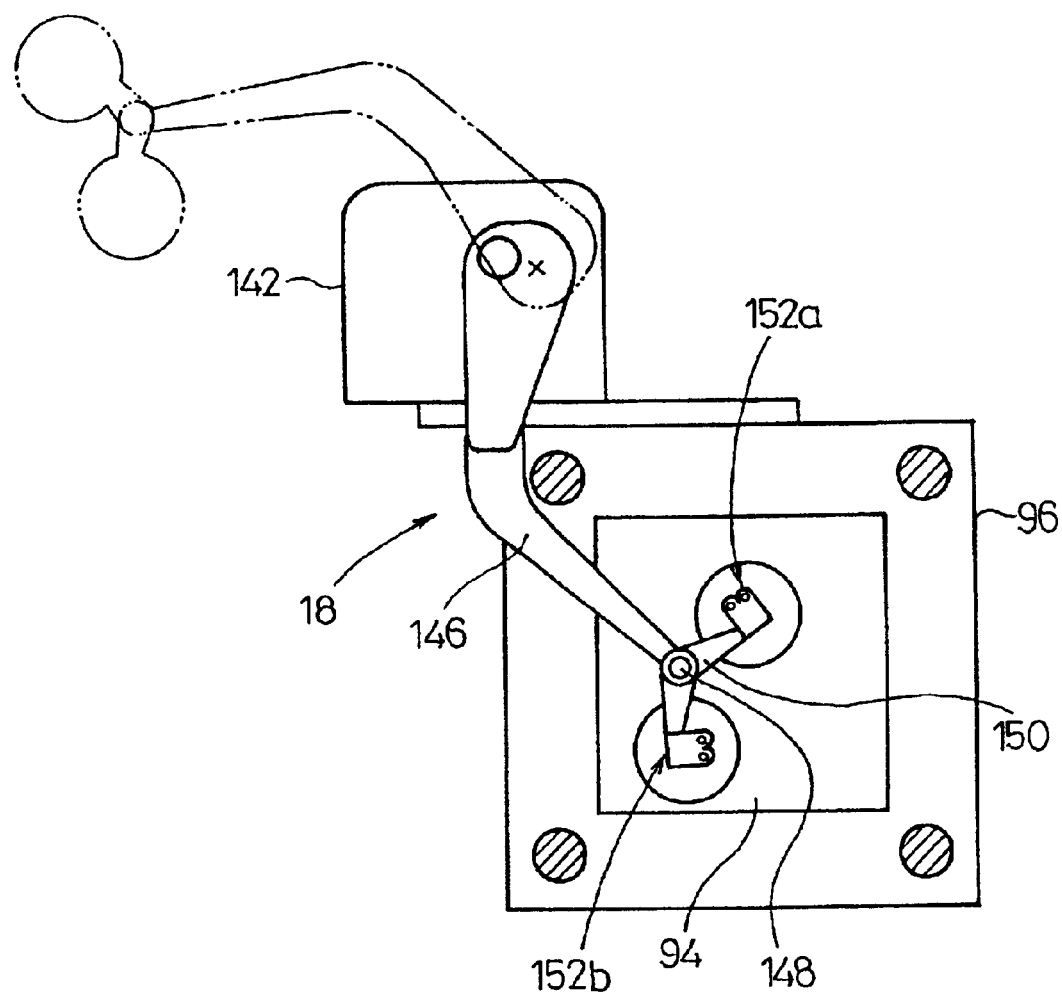
FIG. 6 is a view showing the manner in which the substrate removal mechanism operates.

The injection molding process is carried out by the injection molding apparatus 12 which is shown in FIGS. 2 through 6. As shown in FIGS. 4 and 6, the injection molding apparatus 12 has two stampers 110a, 110b for simultaneously forming two substrates 202, and two stamper holders 112a, 112b for holding the stampers 110a, 110b. As shown in FIG. 2, the injection molding apparatus 12 has an injector 78 for injecting a resin into a mold assembly 76, and a compression molding assembly 80 for clamping the mold assembly 76 to compression-mold the resin supplied to the mold assembly 76. The injector 78 and the compression molding assembly 80 are mounted on a base 82.

The injector 78 comprises a hopper 86 for temporarily holding a charged molding material (also referred to as "molten resin" or "resin") 84, and an extrusion cylinder 90 for heating and melting the molding material 84 supplied from the hopper 86 and extruding the molding material 84 into two nozzles 88a, 88b. The extrusion cylinder 90 comprises a screw-type extrusion cylinder having a screw 92. The extrusion cylinder 90 is movable toward and away from the compression molding assembly 80 by a reciprocating mechanism (not shown).

The compression molding assembly 80 comprises a fixed die plate 96 on which a fixed mold 94 of the mold assembly 76 is removably mounted, a movable die plate 100 which is movable toward and away from the fixed mold 94 mounted on the fixed die plate 96 and on which a movable mold 98 of the mold assembly 76 is removably mounted, and a reciprocating mechanism 102 for moving the movable die plate 100 horizontally toward and away from the fixed die plate 96.

As shown in FIG. 3, the fixed mold 94 has a surface processed to a mirror finish which faces the movable mold 98 and on which the two stampers 110a, 110b, indicated by the two-dot-and-dash lines in FIG. 4, are mounted. The fixed mold 94 also has in its central region the two stamper holders 112a, 112b associated respectively with the stampers 110a, 110b. Sprue pushers 114a, 114b are disposed centrally in the respective stamper holders 112a, 112b and extend axially therethrough. As shown in FIG. 4, the stamper holders 112a, 112b have integral hooks 116a, 116b on their portions facing the movable mold 98 for securing the respective stampers 110a, 110b in position.

The movable mold 98 has a surface processed to a mirror finish which faces the stampers 110a, 110b. Punches 120a, 120b are slidably disposed centrally in the movable mold 98, and rings 122a, 122b are mounted on an outer circumferential edge of the movable mold. 98. The rings 122a, 122b have gaps as gas release passages having a thickness of about 20 μm in their portions confronting the stampers 110a, 110b, and are held against the fixed mold 94 radially outwardly of the stampers 110a, 110b.

The reciprocating mechanism 102 of the compression molding assembly 80 may comprise a piston reciprocating mechanism having a piston movable back and forth by supplying and discharging a fluid such as oil, for example. As shown in FIG. 2, if the reciprocating mechanism 102 comprises a piston reciprocating mechanism, then the reciprocating mechanism 102 has a cylinder 132 in which a piston 130 is reciprocally movable by supplying and discharging oil, a flanged fixing plate 134 by which the cylinder 132 is fixed to the base 82, and a plurality of guide shafts 136 attached to and extending between four corners of the flanged fixing plate 134 and four corners of the fixed die plate 96.

A piston rod 138 has an end secured to the piston 130 and an opposite end secured to the movable die plate 100. The movable die plate 100 has four through holes (not shown) defined in four corners thereof, and the guide shafts 136 extend through the respective four through holes.

When the piston 130 is moved forward by supplying oil to and discharging oil from the cylinder 132, the movable die plate 100 is pushed forward by the piston rod 138, displacing the movable mold 98 toward the fixed mold 94, i.e., clamping the movable mold 98 on the fixed mold 94. Conversely, when the piston 130 is moved backward by supplying oil to and discharging oil from the cylinder 132, the movable die plate 100 is pulled backward by the piston rod 138, displacing the movable mold 98 away from the fixed mold 94, i.e., releasing the movable mold 98 from the fixed mold 94.

The injection molding apparatus 12 also has the arm mechanism 18 for removing two molded substrates 202 from the mold assembly 76. As shown in FIGS. 5 and 6, the arm mechanism 18 comprises a drive motor 142 fixedly mounted on an upper surface of the fixed die plate 96, and a substantially L-shaped arm 146 having a rear end fixed to a motor shaft 144 of the drive motor 142.

A rotatable support shaft 148 is mounted on a distal end of the arm 146, and a bifurcated arm 150 including two arm members extending in two different directions is fixed to the rotatable support shaft 148. Chuck mechanisms 152a, 152b for holding respective substrates 202 are mounted on respective distal ends of the arm members of the arm 150. The support shaft 148 is connected to an actuator (not shown), which, when energized, rotates the support shaft 148 to turn the arm 150 with respect to the arm 146.

When the drive motor 142 is energized to turn the arm 146 in one direction, the arm 146 enters the mold assembly 76 which has been open. When the drive motor 142 is energized to turn the arm 146 in the opposite direction, the arm 146 is turned away from the mold assembly 76.

The chuck mechanisms 152a, 152b have respective suction pads 154a, 154b for holding molded substrates 202 under vacuum, and respective mechanical chucks 156a, 156b for sandwiching and holding runners in position.

Therefore, two simultaneously molded substrates 202 are simultaneously held by the suction pads 154a, 154b and the mechanical chucks 156a, 156b.

A process of manufacturing an optical disk D with the production system 10 will be described below with reference to FIGS. 7 through 11B.

Figure 7:
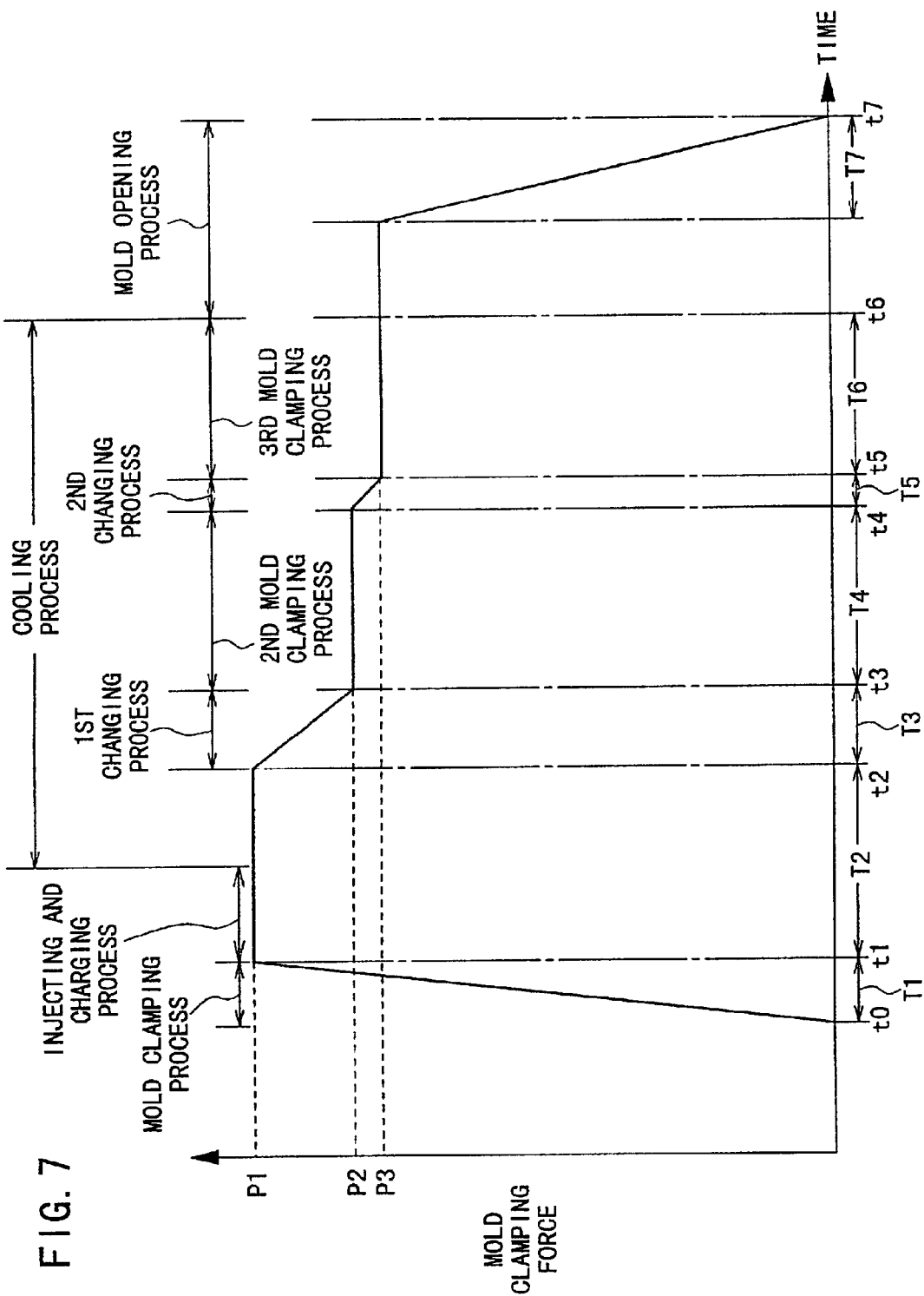
FIG. 7 is a sequence diagram of an operation sequence of the substrate removal mechanism.

First, operation of the injection molding apparatus 12 to simultaneously mold two substrates 202 for optical disks D will be described below with reference to the sequence diagram shown in FIG. 7.

A mold clamping process starts from a molding start time t0, and the reciprocating mechanism 102 moves for a forward pressure buildup to displace the movable mold 98 toward the fixed mold 94 over a clamping pressure buildup time T1. When the mold clamping force of the mold assembly 76 reaches a preset value P1 at a time t1, the mold clamping process is completed. Then, the molten resin 84 (see FIG. 2) starts being charged into cavities 104a, 104b (see FIG. 4) defined between the movable mold 98 and the fixed mold 94 of the mold assembly 76.

In the injector 78, the molding material (resin) 84 is delivered from the hopper 86 into the extrusion cylinder 90. The resin 84 delivered into the extrusion cylinder 90 is heated, melted, and mixed while passing through the groove of the screw 92. As the molten resin 84 passes through the groove of the screw 92, the screw 92 is retracted, allowing the molten resin 84 to be stored in a barrel 158 in the front end of the extrusion cylinder 90.

When the barrel 158 stores an amount of molten resin 84 large enough to mold two substrates 202 in one injection cycle, the screw 92 moves forward to push the molten resin 84 through the nozzles 88a, 88b into the mold assembly 76.

The molten resin 84 is supplied via runners 115a, 115b (see FIG. 3) in the sprue pushers 114a, 114b in the fixed mold 94 into the cavities 104a, 104b. In this injecting and charging process, the preset mold clamping force (initial mold clamping force P1) is maintained over a holding time T2 for uniformly charging the molten resin 84 in the cavities 104a, 104b.

A cooling process starts from an intermediate point in the holding time T2. Immediately after the molten resin 84 is charged in the cavities 104a, 104b, the punches 120a, 120b (see FIG. 4) in the central region of the movable mold 98 move toward the fixed mold 94, cutting off radially inner portions of the molded substrates 202 to define central holes therein (radially inner portion cutting process).

The cooling process comprises a first changing process for changing the initial mold clamping force P1 to a second mold clamping force P2 lower than the initial mold clamping force P1 for a time T3 from an end time t2 of the holding time T2, a second mold clamping process for maintaining the second mold clamping force P2 for a given time T4 (second mold clamping time) from a time t3 when the second mold clamping force P2 is reached, a second changing process for changing the second mold clamping force P2 to a third mold clamping force P3 lower than the second mold clamping force P2 for a time T5 from the time t4 when the second mold clamping time T4 expires, and a third mold clamping process for maintaining the third mold clamping force P3 for a given time T6 (third mold clamping time) from a time t5 when the third mold clamping force P3 is reached.

Through the above processes of the cooling process, the molten resin 84 charged into the cavities 104a, 104b is solidified. At this time, recesses and protrusions formed on the stampers 110a, 110b are transferred to principal surfaces of the substrates 202, thus forming spiral or concentric grooves 200 in the substrates 202.

At a time t6 when the third mold clamping process is finished, a mold opening process begins. For a given mold releasing time T7, the reciprocating mechanism 102 moves for a backward pressure buildup to displace the movable mold 98 away from the fixed mold 94. After elapse of a predetermined time from a time t7 when the mold clamping force of the mold assembly 76 is eliminated, the drive motor 142 of the arm mechanism 18 (see FIGS. 5 and 6) is energized to turn the arm 146 in one direction until its distal end enters the mold assembly 76. The surfaces of the two molded substrates 202 are held by the suction pads 154a, 154b, and the runners are held by the mechanical chucks 156a, 156b. When the chucking of the substrates 202 is completed, the drive motor 142 is energized to turn the arm 146 back to its original position. While the arm 146 is returning to its original position, the runners are released from the mechanical chucks 156a, 156b, and retrieved in a retrieval box (not shown), and the disk-shaped substrates 202 each having a central hole defined therein are delivered to a next process.

The substrates 202 may be made of an acrylic resin such as polycarbonate, polymethacrylate, etc., a vinyl chloride resin such as polyvinyl chloride, vinyl chloride copolymer, etc. If desired, substrates 202 may be made of a mixture of some of these materials. Of the above materials, polycarbonate is preferable for better moisture resistance, dimensional stability, and price.

In the first embodiment, the stampers 110a, 110b which are used are designed such that they produce grooves 200 in the substrate 202 which have a depth of 175 nm and a width of 500 nm. If the grooves 200 were deeper, then the substrates 202 would tend to fail to be separated well from the stampers 110a, 110b and desired recesses and protrusions would not be transferred well from the stampers 110a, 100b to the substrates 202. If the grooves 200 were wider, then desired recesses and protrusions would not be transferred well from the stampers 110a, 110b to the substrates 202.

The grooves 200 formed in the above injection molding process should have a depth ranging from 80 nm to 250 nm and a width ranging from 200 nm to 800 nm, and preferably have a depth ranging from 110 nm to 220 nm and a width ranging from 300 nm to 700 nm, and more preferably have a depth ranging from 130 nm to 200 nm and a width ranging from 400 nm to 600 nm. If the depth of the grooves 200 is to be increased, then it is necessary to increase the mold clamping force.

The above injection molding process is repeated to mold two substrates 202 simultaneously in successive cycles.

Figure 8:
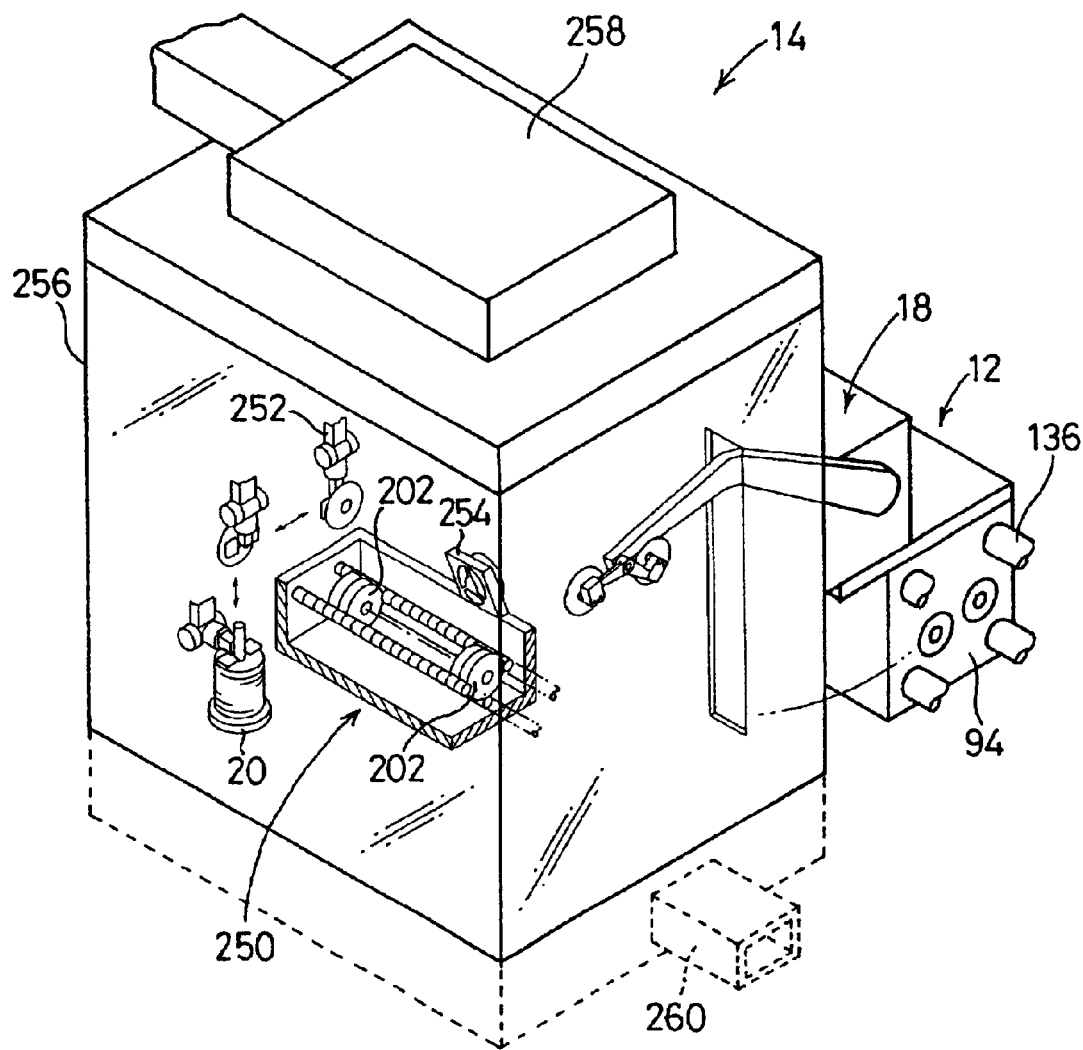
FIG. 8 is a perspective view of a cooling apparatus used in a cooling process in the method according to the first embodiment.

The cooling process is carried out by cooling apparatus 14 which is shown in FIG. 8. As shown in FIG. 8, the cooling apparatus 14 comprises a feed screw mechanism 250 for feeding vertically oriented sets of two simultaneously molded substrates 202 in one direction, a feed mechanism 252 for taking one at a time of the substrates 202 fed by the feed screw mechanism 250 and stacking the substrate 202 on the stack pole 20, a cooling air generator 254 for applying cooling air to the substrates 202 that are being fed by the feed screw mechanism 250, and a housing 256 which accommodates the feed screw mechanism 250, the feed mechanism 252, and the cooling air generator 254 therein for isolation from the outer environment.

Figure 9:
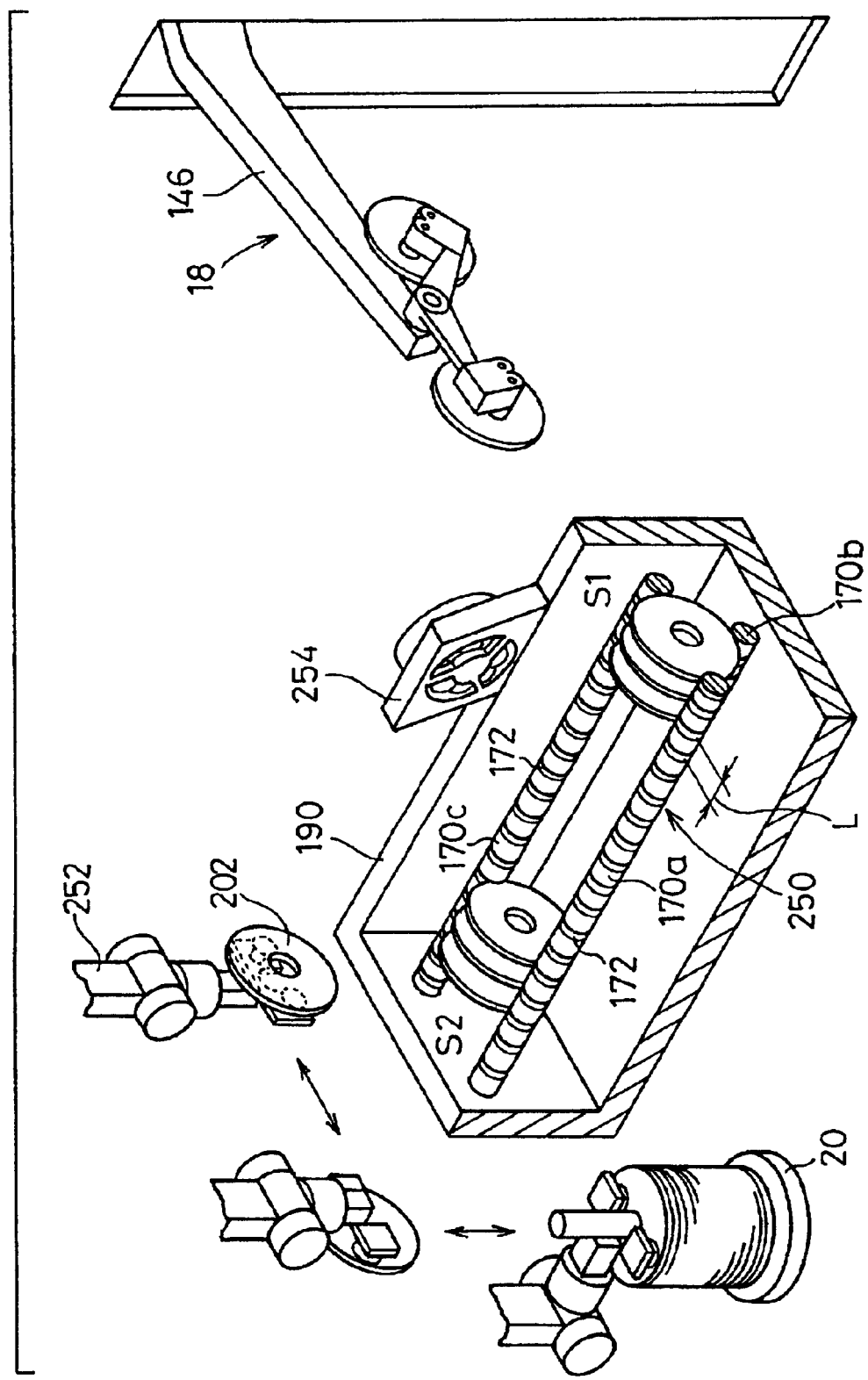
FIG. 9 is an enlarged perspective view of various devices installed in a housing of the cooling apparatus.

As shown at an enlarged scale in FIG. 9, the feed screw mechanism 250 has three parallel rotatable feed screws 170a, 170b, 170c that have screw grooves 172 for holding outer circumferential edges of the substrates 202 in contact therewith. When the feed screws 170a, 170b, 170c are rotated in one direction about their own axes by a drive motor (not shown), the substrates 202 held by the feed screw mechanism 250 are fed toward a discharge position S2 in the feed screw mechanism 250. When the substrates 202 successively reach the discharge position S2, they are successively removed from the feed screw mechanism 250 by the feed mechanism 252, and stacked on the stack pole 20.

In the feed screw mechanism 250, the substrates 202 may be fed continuously by an AC motor or intermittently by a stepping motor. In the first embodiment, the substrates 202 may be fed intermittently by a stepping motor.

In FIG. 9, the substrates 202 in the feed screw mechanism 250 are spaced at a pitch L (spacing between adjacent substrates 202) which is at least six times the thickness of each of the substrates 202. In this embodiment, the pitch L is about ten times the thickness (1.2 mm) of each of the substrates 202, i.e., about 12 mm.

The cooling air generator 254 is mounted on an upper end of a side panel 190 that defines one side of the feed screw mechanism 250, and is inclined at such an angle and has an impeller having such a length that it can apply cooling air to ten substrates 202 from a substrate charging position S1 in the feed screw mechanism 250. The cooling air generator 254 may be mounted on the upper end of the side panel 190 by a fastener with a hinge, so that the angle of the cooling air generator 254 can easily be adjusted with respect to the side panel 190.

In FIG. 8, the housing 256 is made of sheet glass, for example, to isolate the feed screw mechanism 250, the feed mechanism 252, and the cooling air generator 254 accommodate therein from the outer environment while allowing the operator to visually observe the mechanisms in the housing 256. A high efficiency particulate air (HEPA) filter 258 is mounted on an upper panel of the housing 256, and a discharge duct 260 is mounted on a lower panel of the housing 256. Clean air from the HEPA filter 258 flows through the entire space in the housing 256, and is then discharged from the discharge duct 260.

The temperature in the housing 256 is controlled so as to be substantially equal to the temperature (e.g., about 23° C.±0.3° C.) at which the dye is coated on substrates 202.

Operation of the cooling apparatus 14 will be described below. When two substrates 202 are simultaneously molded by the injection molding apparatus 12, the mold assembly 76 is opened, and the molded substrates 202 are simultaneously removed from the mold assembly 76 by the chuck mechanisms 152a, 152b which attract the substrates 202 under vacuum. Thereafter, the arm 146 is turned toward the substrate charging position S1 in the feed screw mechanism 250.

The substrates 202 placed in the substrate charging position S1 in the feed screw mechanism 250 are alternately supplied to and vertically held in the screw grooves 172 in the three feed screws 170a, 170b, 170c of the feed screw mechanism 250.

Specifically, the substrate 202 supported by the chuck mechanism 152b is supplied to the feed screw mechanism 250, and then the support shaft 148 on the arm 146 is turned by the actuator (not shown) to supply the substrate 202 supported by the chuck mechanism 152a to the feed screw mechanism 250. A substrate 202 is supplied to the feed screw mechanism 250 when the feed screw mechanism 250 is at rest between intermittent motions thereof. In this manner, substrates 202 are successively supplied from the arm mechanism 18 to the feed screw mechanism 250.

The substrates 202 supplied to the feed screw mechanism 250 are then successively fed toward the discharge position S2 in the feed screw mechanism 250 upon rotation of the three feed screws 170a, 170b, 170c.

While the substrates 202 are being successively fed by the feed screw mechanism 250, they are gradually cooled by a downward flow of clean air that has passed through the HEPA filter 258. If the pitch L of the substrates 202 were too small, then heat would tend to be stored between the substrates 202, resulting in a large temperature difference between inner and outer circumferential regions of the substrates 202.

According to the first embodiment, however, since the pitch L of the substrates 202 is set to at least six times, specifically, ten times, the thickness of each of the substrates 202, clean air flows smoothly and efficiently between the substrates 202, and each of the substrates 202 is not significantly affected by the radiant heat from adjacent substrates 202. Thus, any temperature difference between inner and outer circumferential regions of the substrates 202 is minimized.

In the first embodiment, since cooling air from the cooling air generator 254 is applied to the substrates 202, the substrates 202 can efficiently be cooled, and the cooling apparatus 14 can be made compact as there is no need to increase the length of a feed path for cooling the substrates 202.

Of the substrates 202 that are intermittently fed by the three feed screws 170a, 170b 170c, the substrate 202 that has arrived at the discharge position S2 is removed from the feed screw mechanism 250 by the feed mechanism 252 while the feed screw mechanism 250 is at rest. The removed substrate 202 is then fed to the stack pole 20 by the feed mechanism 252, and stacked the existing stack of substrates 202 on the stack pole 20.

In the above process of producing the substrate 202 according to the first embodiment, two simultaneously injection-molded substrates 202 are alternately placed with their surfaces oriented vertically, and arranged at a pitch L which is at least six times the thickness of each of the substrates 202, and cooling air is applied to the substrates 202 thus arranged. Therefore, the substrates 202 can be cooled without the development of a temperature difference between inner and outer circumferential regions of the substrates 202.

Specifically, because the substrates 202 are alternately placed vertically, the inner and outer circumferential regions of the substrates 202 can be cooled at a constant rate, and the substrates 202 thus cooled are stable and free from mechanical fluctuations such as warpage and swaying. The substrates 202 thus produced are effective in improving the characteristics of information recording mediums.

Preferred examples of the present invention will be described below.

The pitch L at which the substrates 202 are spaced should preferably be at least six times the thickness of each of the substrates 202, and more preferably be at least eight times the thickness of each of the substrates 202. The upper limit for the pitch L at which the substrates 202 are spaced should preferably be at most 100 times the thickness of each of the substrates 202, more preferably be at most 50 times the thickness of each of the substrates 202, or most preferably be at most 30 times the thickness of each of the substrates 202.

If each of the substrates 202 were not cooled uniformly in its inner and outer circumferential regions, then, the substrate 202 would suffer local warpage, resulting in a quality problem. If the members which support substrates 202 while they are being cooled, i.e., the feed screws 170a, 170b, 170c, had a high thermal conductivity, then the temperature of the regions of the substrates 202 which contact those feed screws 170a, 170b, 170c would drop sharply, resulting in a temperature difference between those regions and other regions which would tend to cause local warpage. To prevent such local warpage, the members which support substrates 202 while they are being cooled, i.e., the feed screws 170a, 170b, 170c, should preferably be made of synthetic resin. While any synthetic resins that can be machined can be used, polyacetal is particularly preferable.

The feed screw mechanism 250 for feeding substrates 202 in one direction is preferably used to feed substrates 202. A conventional magazine may be used to feed substrates 202. If a conventional magazine is used to feed substrates 202 in one direction, however, when each of substrates 202 is to be stored in the magazine, the substrate 202 needs to be placed in a different position or the magazine needs to be moved slightly. Therefore, more movable components are involved, tending to produce dirt and dust particles.

With the feed screw mechanism 250, the substrates 202 are fed in one direction only when the feed screws 170a, 170b, 170c are rotated. Therefore, more movable components are not involved, and the tendency to produce dirt and dust particles is low.

If the feed screw mechanism 250 is used to feed substrates 202, then portions of the feed screw mechanism 250 which are held in contact with the substrates 202 should preferably be slippery. Since the substrates 202 are held in sliding contact with the feed screw mechanism 250 at all times, the portions of the feed screw mechanism 250 which are held in contact with the substrates 202 and the substrates 202 themselves should be made of materials resistant to wear and scraping. If the portions of the feed screw mechanism 250 which are held in contact with the substrates 202 and the substrates 202 themselves were easily worn or scraped off, then particles that are produced would be attached to the substrates 202, and would become defects on recording layers formed on the substrates 202, causing errors when information recording mediums are in operation.

The materials resistant to wear and scraping should preferably be self-lubricating materials, and should preferably have a mechanical strength that is not largely different from the mechanical strength of the substrates 202. One of the materials which satisfy these requirements is polyacetal.

When the substrates 202 are fed intermittently by the feed screw mechanism 250, they should preferably be fed intermittently at a time interval ranging from 1 second to 60 seconds. If the time interval were too long, then the substrate 202 that is finally placed vertically in the feed screw mechanism 250 would be held in a poor surrounding temperature distribution for a long period of time, and hence would tend to suffer unwanted warpage. If the time interval were too short, then the substrates 202 would not sufficiently be cooled and hence would also tend to suffer unwanted warpage.

The time interval at which the substrates 202 are fed intermittently by the feed screw mechanism 250 should preferably be at most 60 seconds, more preferably be at most seconds, or most preferably be at most 15 seconds, and should preferably be at least 1 second, more preferably be at least 2 seconds, or most preferably be at least 3 seconds.

When the feed screw mechanism 250 feeds substrates 202 in one direction, the substrates 202 may be rotated about their own axes. If the substrates 202 are rotated about their own axes, since cooling air is applied uniformly to the substrates 202, any temperature difference between inner and outer circumferential regions of the substrates 202 is minimized.

Each of the substrates 202 is cooled for a period of time which should preferably be at least 3 minutes, more preferably be at least 4 minutes, or most preferably be at least 6 minutes.

Immediately after a substrate 202 is injection-molded, its temperature is high. Therefore, if molded substrates 202 were placed vertically between the feed screws 170a, 170b, 170c of the feed screw mechanism 250 immediately after they are injection-molded, then the feed screws 170a, 170b, 170c would be liable to be deformed due to the heat. For this reason, molded substrates 202 should be placed vertically between the feed screws 170a, 170b, 170cpreferably at least 1 second, more preferably at least 2 seconds, or most preferably at least 3 seconds after the mold assembly has been opened. In addition, molded substrates 202 should be placed vertically between the feed screws 170a, 170b, 170c after the temperature of the molded substrates 202 has dropped preferably to at most 115° C., more preferably to at most 105° C., or most preferably to at most 95° C.

In the first embodiment, after two substrates 202 which have just been injection-molded are simultaneously removed from the injection molding apparatus 12 by the arm 146 of the arm mechanism 18, the substrates 202 are changed into the substrate charging position S1 in the feed screw mechanism 250. Therefore, it is easy to keep at least 1 second until the substrates 202 are vertically arranged in the feed screw mechanism 250 after the mold assembly is opened, and the substrates 202 are vertically arranged in the feed screw mechanism 250 when the temperature of the substrates 202 drops to at most 115° C.

If cooling air contains dust particles, then they may possibly be attached to the substrates 202, resulting in defects in information recording mediums. Particularly, if a recording layer containing a dye is formed by a spin coating process, then since the presence of dust particles is responsible for a large defect in the recording layer, care should be exercised not to introduce dust particles. The probability that dust particles are attached to substrates 202 is low if the substrates 202 are not electrically charged. Therefore, it is preferable to apply cooling air to the substrates 202 while electric charges are being removed from the substrates 202.

It is preferable to use clean air having passed through a cleaning filter as cooling air. It is also preferable to use a charge removal bar for removing electric charges from the substrates 202, or to apply charge-removed air from a charge-removed air generator that the cooling air generator 254 doubles as. Not all air applied to the substrates 202 may be charge-removed air, but only part of air applied to the substrates 202 may be charge-removed air. For example, of the cooling air from the cooling air generator 254 and the clean air from the HEPA filter 258, only the cooling air from the cooling air generator 254 may be charge-removed air.

A process of processing a cooled substrate 202 will be described below with reference to FIGS. 10A through 11B.

Figure 10A:
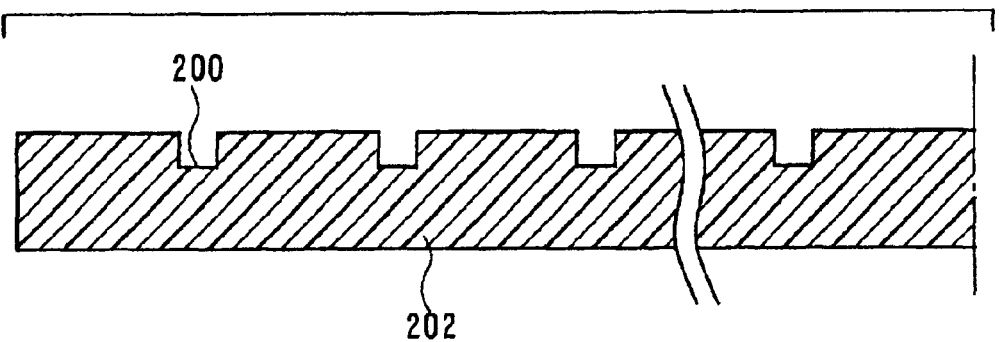
FIG. 10A is a fragmentary cross-sectional view of a substrate with grooves defined therein.

As shown in FIG. 10A, a substrate 202 placed on the stack pole 20 has grooves (recesses and protrusions) 200 serving as tracking grooves or representing information such as address signals on one principal surface thereof. The substrate 202 is fed one at a time to the dye solution coating mechanism 28 by the first feed mechanism 40.

Figure 10B:
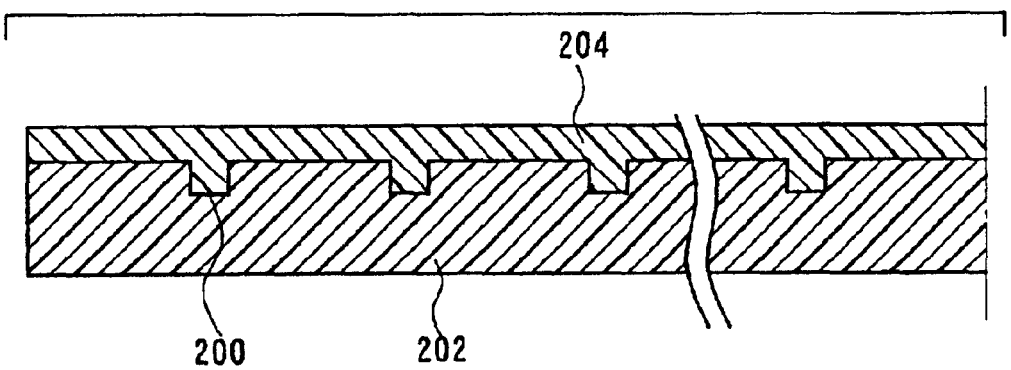
FIG. 10B is a fragmentary cross-sectional view of the substrate with a dye recording layer deposited thereon.

When the substrate 202 is fed to the dye solution coating mechanism 28, the principal surface thereof is coated with a dye solution, and then the substrate 202 is rotated at a high speed to uniformize the thickness of the coated dye solution, which is then dried. In this manner, as shown in FIG. 10B, a dye recording layer 204 is formed on the principal surface of the substrate 202.

The dye solution comprises a solvent and a dye dissolved therein. The dye in the dye solution has a concentration which generally ranges from 0.01 to 15 weight %, more preferably from 0.1 to 10 weight %, particularly preferably from 0.5 to 5 weight %, or most preferably from 0.5 to 3 weight %.

The dye used in the dye recording layer 204 is not limited to any particular dye. Examples of dyes that can be used include a cyanine dye, a phthalocyanine dye, an imidazoxinoxysaline dye, a pyrylium-thiopyrylium dye, an azulenium dye, a squarylium dye, a metal complex salt dye such as Ni, Cr, or the like, a naphthoquinone dye, an anthraquinone dye, an indophenol dye, an indoaniline dye, a triphenylmethane dye, a merocyanine dye, an oxonol dye, an aminium-diimmonium dye, and a nitroso compound. Of these dyes, a cyanine dye, a phthalocyanine dye, an azulenium dye, a squarylium dye, an oxonol dye, and an imidazoxinoxysaline dye are preferable.

The solvent of the application agent for forming the dye recording layer 204 includes, for example, ester such as butyl acetate and cellosolve acetate; ketone such as methyl ethyl ketone, cyclohexanone, and methyl isobutyl ketone; chlorinated hydrocarbon such as dichloromethane, 1,2-dichloroethane, and chloroform; amide such as dimethylformamlde, hydrocarbon such as cyclohexane; ether such as tetrahydrofuran, ethyl ether, and dioxane; alcohol such as ethanol, n-propanol, isopropanol, n-butanol, and diacetone alcohol; fluorine solvent such as 2,2,3,3,-tetrafluoro-1-propanol, and glycol ether such as ethylene glycol monomethyl ether, ethylene glycol monoethyl ether, and propylene glycol monomethyl ether.

The solvent may be used singly or in combination of two or more species in an appropriate manner considering the dissolving property of the dye to be used. Preferably, the fluorine solvent such as 2,2,3,3,-tetrafluoro-1-propanol is used. An anti-fading agent and a binder may be added to the dye solution, if desired. Further, a variety of additives such as an antioxidant, a UV-absorbing agent, a plasticizer, and a lubricant may be added to the dye solution depending on the purpose of the use.

Representative examples of the anti-fading agent include nitroso compound, metal complex, diimmonium salt, and aminium salt. These examples are described, for example, in respective patent documents such as Japanese Laid-Open Patent Publication Nos. 2-300288, 3-224793, and 4-146189.

The binder includes, for example, natural organic high-molecular compound such as gelatin, cellulose derivative, dextran, rosin, and rubber; and synthetic organic high-molecular compound including, for example, hydrocarbon resin such as polyethylene, polypropylene, polystyrene, and polyisobutylene, vinyl resin such as polyvinyl chloride, polyvinyl vinylidene, and polyvinyl chloride-polyvinyl acetate copolymer, acrylic resin such as polymethyl acrylate and polymethyl methacrylate, polyvinyl alcohol, chlorinated polyethylene, epoxy resin, butylal resin, rubber derivative, and initial condensate of thermosetting resin such as phenol-formaldehyde resin.

When the binder is used, the binder is generally used in an amount of not more than 20 parts by weight, preferably not more than 10 parts by weight, and more preferably not more than 5 parts by weight with respect to 100 parts by weight of the dye.

An undercoat layer may be provided on the surface of the substrate 202 on the side on which the dye recording layer 204 is formed, for example, in order to improve the flatness, improve the adhesive force, and avoid the deterioration of quality of the dye recording layer 204.

The material for the undercoat layer includes, for example, high-molecular compound such as polymethyl methacrylate, acrylic acid-methacrylic acid copolymer, styrene-maleic anhydride copolymer, polyvinyl alcohol, N-methylol acrylamide, styrene-vinyltoluene copolymer, chlorosulfonated polyethylene, nitrocellulose, polyvinyl chloride, chlorinated polyolefine, polyester, polyimide, vinyl acetate-vinyl chloride copolymer, ethylene-vinyl acetate copolymer, polyethylene, polypropylene, and polycarbonate; and surface modifier such as silane coupling agent.

The undercoat layer can be formed such that the foregoing substance is dissolved or dispersed in an appropriate solvent to prepare an undercoat layer solution, and then the undercoat layer solution is applied to the surface of the substrate 202 by utilizing an application method such as spin coat, dip coat, and extrusion coat. The layer thickness of the undercoat layer is generally within a range of 0.005 to 20 $\mu$m, and preferably within a range of 0.01 to 10 $\mu$M.

The substrate 202 on which the dye recording layer 204 is formed is fed by the second feed mechanism 42 to the inspecting mechanism 30, which inspects the substrate 202 and the dye recording layer 204 for any defects and checks the thickness of the dye recording layer 204. Specifically, the inspecting mechanism 30 applies light to the reverse side of the substrate 202 and processes an image of light transmitted through the substrate 202 and the dye recording layer 204 with a CCD camera. The inspected result obtained by the inspecting mechanism 30 is transmitted to the sorting mechanism 36.

Based on the inspected result, the sorting mechanism 36 sorts the substrate 202 selectively to the stack pole 32 for normal substrates and the stack pole 34 for defective substrates.

When a predetermined number of substrates 202 have been stacked on the stack pole 32 for normal substrates, the third feed mechanism 66 is actuated to take one at a time of the substrates 202 from the stack pole 32, and feed the substrate 202 to the drying furnace 44. In the drying furnace 44, the substrate 202 is dried with heat to stabilize the light reflectance of the dye recording layer 204 on the substrate 202. Thereafter, the substrate 202 is fed to the sputtering mechanism 46 by the third feed mechanism 66.

In the first embodiment, the substrate 202 is dried in the drying furnace 44 at a temperature of 80° C. for 20 minutes.

Figure 10C:
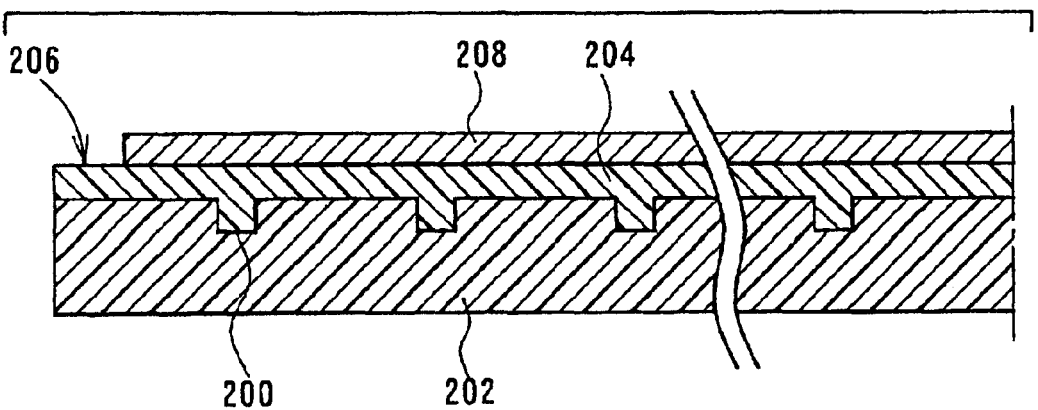
FIG. 10C is a fragmentary cross-sectional view of the substrate with a light reflecting layer disposed on the dye recording layer.

When the substrate 202 is supplied to the sputtering mechanism 46, as shown in FIG. 10C, a light reflecting layer 208 is formed, by sputtering, on the entire principal surface of the substrate 202 except for a peripheral edge 206 thereof.

The light reflecting layer 208 is made of a light reflecting material which has a high reflectance with respect to a laser beam. For example, the light reflecting material may be a metal or a semimetal such as Mg, Se, Y, Ti. Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi, or the like, or stainless steel.

Of these materials, Cr, Ni, Pt, Cu, Ag, Au, Al, and stainless steel are preferable. These materials may be used alone or in a combination of or as an alloy of at least two materials. Particularly preferable is Ag or an alloy thereof.

The light reflecting layer 208 can be formed on the dye recording layer 204 by evaporating, sputtering, or ion-plating the light reflecting material. The light reflecting layer 208 has a thickness generally in the range from 10 to 800 nm, preferably in the range from 20 to 500 nm, or more preferably in the range from 50 to 300 nm.

Figure 11A:
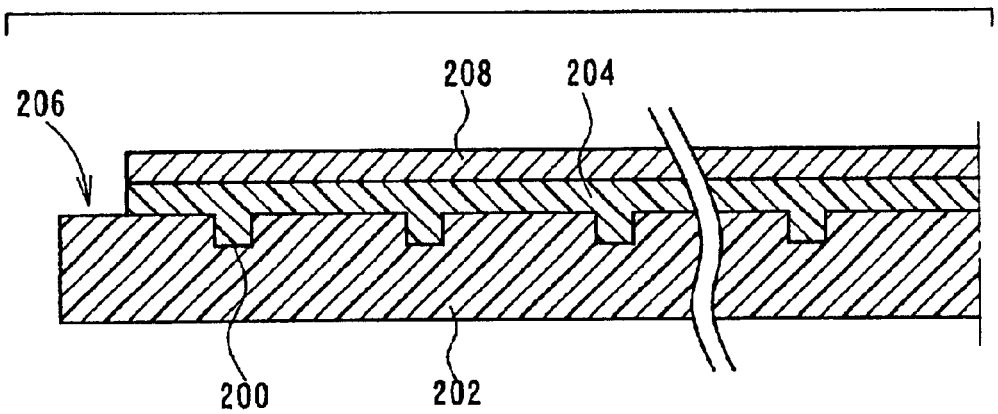
FIG. 11A is a fragmentary cross-sectional view of the substrate with its edge cleaned.

The substrate 202 on which the light reflecting layer 208 is formed is fed by the fourth feed mechanism 68 to the edge cleaning mechanism 48, which, as shown in FIG. 11A, cleans the edge 206 of the principal surface of the substrate 202 to removes the dye recording layer 204 from the edge 206.

Thereafter, the substrate 202 is fed by the fifth feed mechanism 70 to the UV-curable solution coating mechanism 50, which drops an UV-curable solution onto a portion of the principal surface of the substrate 202. Then, the substrate 202 is fed by the sixth feed mechanism 72 to the spinning mechanism 52, which rotates the substrate 202 at a high speed to spread the dropped UV-curable solution to a uniform film thickness over the entire principal surface of the substrate 202.

In the first embodiment, the period of time spent after the growth of the light reflecting layer 208 to the coating of the UV-curable solution is managed so as to range from 2 seconds to 5 minutes.

Figure 11B:
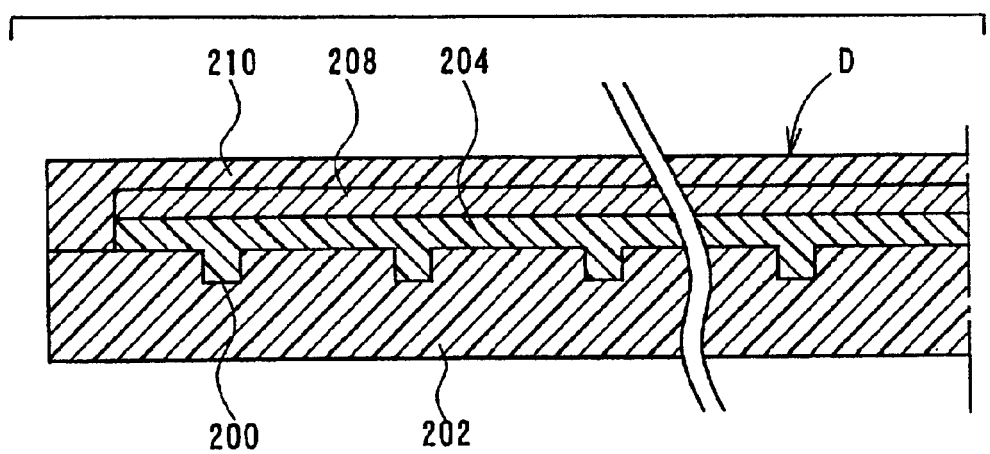
FIG. 11B is a fragmentary cross-sectional view of the substrate with a protective layer disposed thereon.

Thereafter, the substrate 202 is fed by the sixth feed mechanism 72 to the UV applying mechanism 54, which applies ultraviolet rays to the UV-curable solution on the substrate 202. As shown in FIG. 11B, the UV-curable solution is cured into a protective layer 210 covering the dye recording layer 204 and the light reflecting layer 208, thus completing an optical disk D.

The protective layer 210 is disposed on the light reflecting layer 208 for physically and chemically protecting the dye recording layer 204. The protective layer 210 may also be formed on the surface of the substrate 202 opposite to the dye recording layer 204 for the purpose of increasing the scratch resistance and the moisture resistance of the optical disk D. The protective layer 210 may be made of an inorganic substance such as SiO, $SiO_2$, $MgF_2$, $SnO_2$, $Si_3N_4$, or the like, or an organic substance such as a thermoplastic resin, a thermosetting resin, an UV-curable resin, or the like.

The protective layer 210 may alternatively be formed by laminating a film produced by extruding plastics on the light reflecting layer 208 and/or the substrate 202 with an adhesive. Further alternatively, the protective layer 210 may be formed by a process such as vacuum evaporation, sputtering, coating, or the like. If the protective layer 210 is made of a thermoplastic resin or a thermosetting resin, then it is formed by dissolving one of these materials into a suitable solvent to prepare a protective layer solution, and then coating the protective layer solution on the substrate surface and drying the coated protective layer solution.

If the protective layer 210 is made of a UV-curable resin, then it is formed by coating the UV-curable resin directly on the substrate surface or dissolving one UV-curable resin into a suitable solvent to prepare a protective layer solution, and coating the protective layer solution on the substrate surface, and then applying ultraviolet rays to cure the coated UV-curable resin. Various additives including a charge inhibitor, an oxidation inhibitor, an UV absorbent, etc. may be added to the protective layer solution.

The protective layer 210 has a thickness generally in the range from 0.1 to 100 μm.

Subsequently, the optical disk D is fed by the seventh feed mechanism 74 to the defect inspecting mechanism 56 and the characteristic inspecting mechanism 58, which inspect the dye recording layer 204 and the protective layer 210 for defects on their surfaces and also inspect signal characteristics due to the grooves 200 formed in the substrate 202 of the optical disk D. Specifically, each of the defect inspecting mechanism 56 and the characteristic inspecting mechanism 58 applies light to both surfaces of the optical disk D and processes an image of light reflected thereby with a CCD camera. The inspected results obtained by the defect inspecting mechanism 56 and the characteristic inspecting mechanism 58 are transmitted to the sorting mechanism 64.

The optical disk D after it has been inspected for defects and signal characteristics is sorted by the sorting mechanism 64 selectively to the stack pole 60 for normal disks and the stack pole 62 for defective disks depending on the inspected results.

When a predetermined number of optical disks D have been stacked on the stack pole 60, the stack pole 60 is removed from the second processing station 26 and delivered to a label printing process.

Modified feed mechanisms for feeding two simultaneously molded substrates 202, for use in the cooling apparatus 14 of the production system 10, will be described below with reference to FIGS. 12 through 14.

Figure 12:
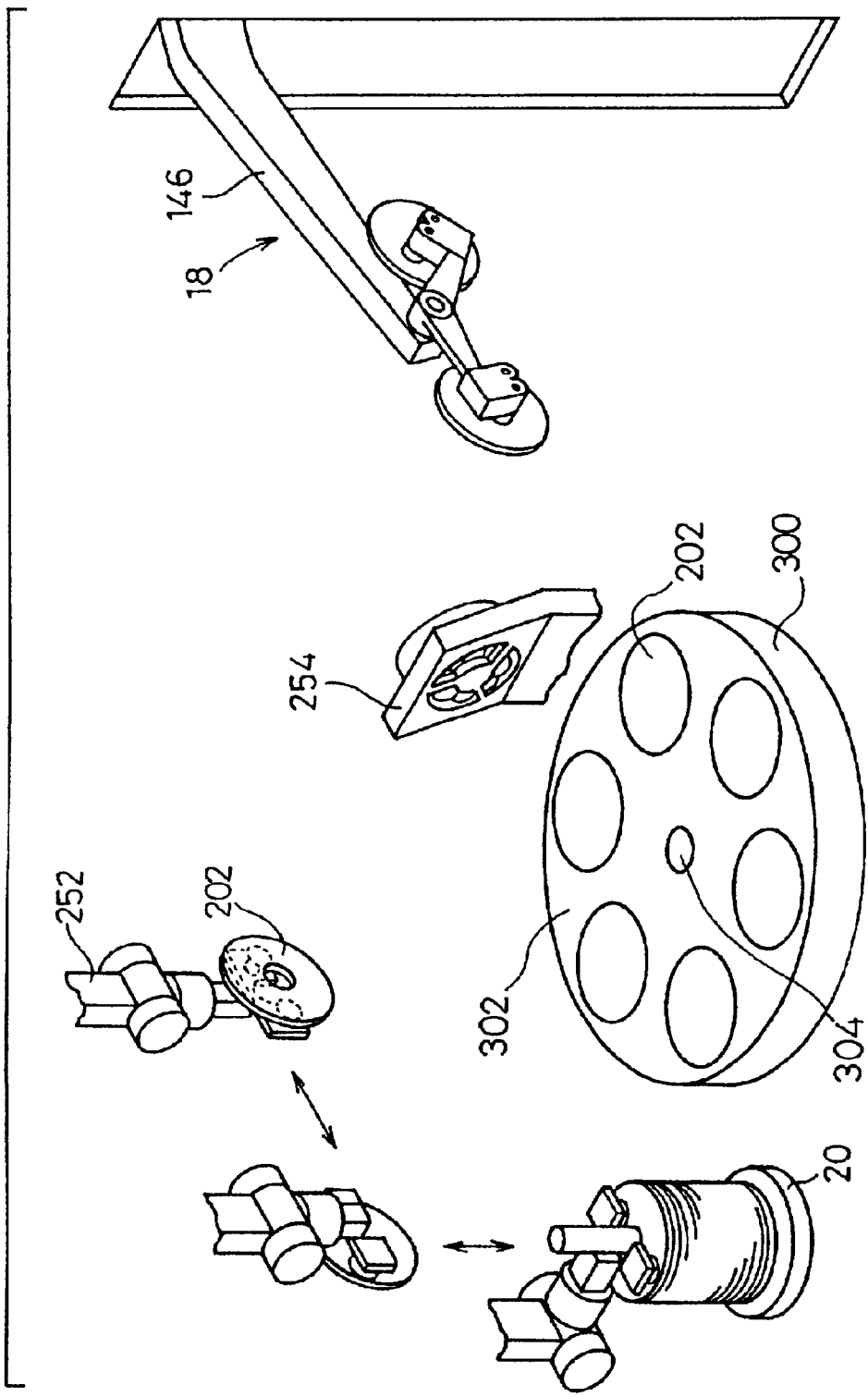
FIG. 12 is a perspective view of a feed mechanism according to a first modification in the cooling apparatus used in the cooling process in the method according to the first embodiment.

FIG. 12 shows a rotary-table feed mechanism for placing substrates 202 flatwise thereon according to a first modification. In FIG. 12, two simultaneously molded substrates 202 are alternately placed flatwise on a table surface 302 of a rotary table 300. The rotary table 300 has a central shaft 304 directly coupled to the rotatable shaft of a drive motor (not shown).

When the drive motor is energized, the rotary table 300 is rotated to feed a plurality of substrates 202 placed flatwise on the table surface 302 in one direction.

Figure 13:
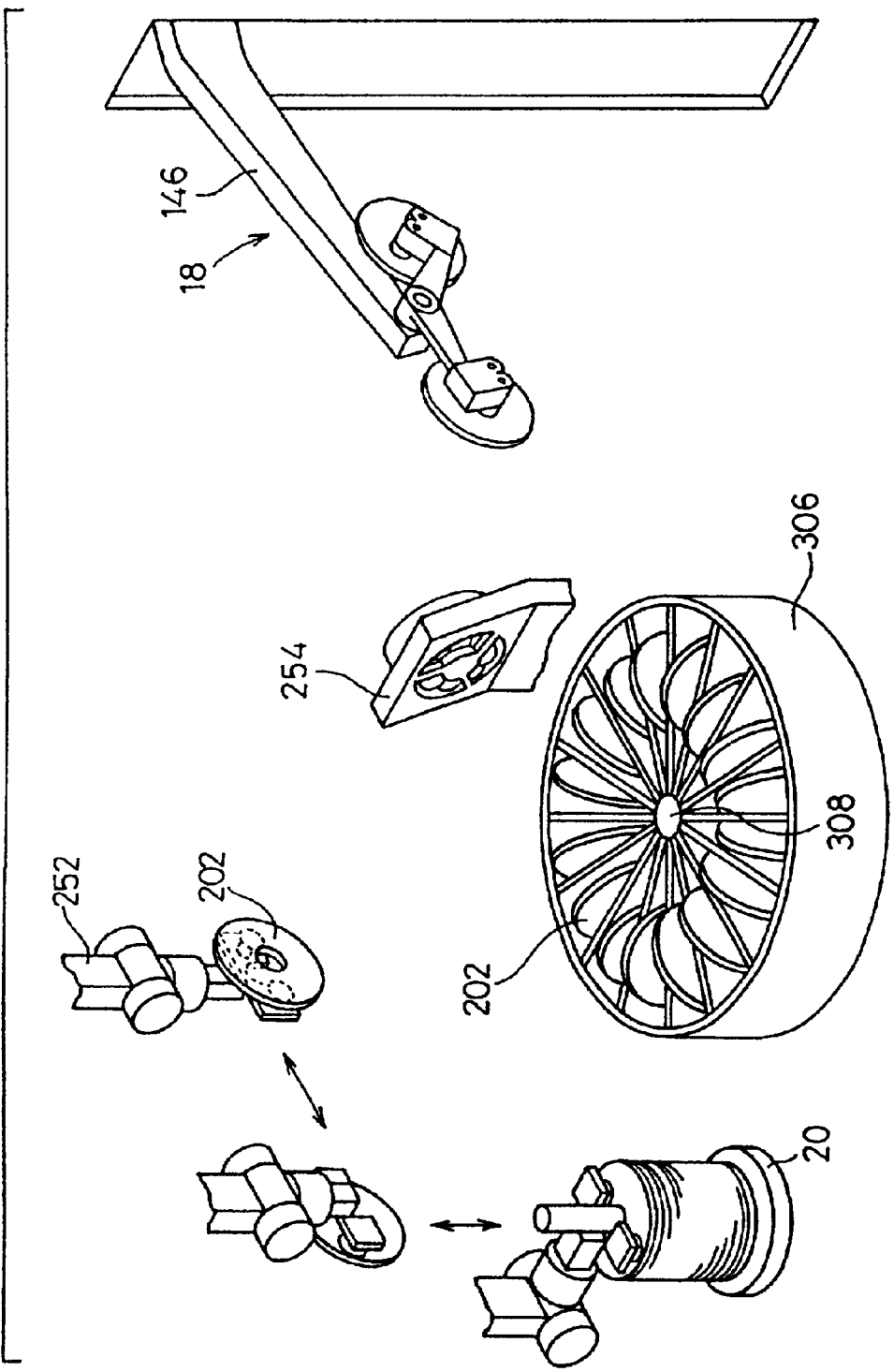
FIG. 13 is a perspective view of a feed mechanism according to a second modification in the cooling apparatus used in the cooling process in the method according to the first embodiment.

FIG. 13 shows a cylindrical feed mechanism for placing substrates 202 with their surfaces oriented substantially vertically therein according to a second modification. In FIG. 13, a rotatable cylinder 306 has a plurality of radial partitions disposed therein, and substrates 202 are placed between the partitions with their surfaces oriented substantially vertically. The cylinder 306 has a central shaft 308 directly coupled to the rotatable shaft of a drive motor (not shown).

Two simultaneously molded substrates 202 are alternately placed vertically in the cylinder 306. When the drive motor is energized, the cylinder 306 is rotated to feed a plurality of substrates 202 placed vertically therein in one direction.

Figure 14:
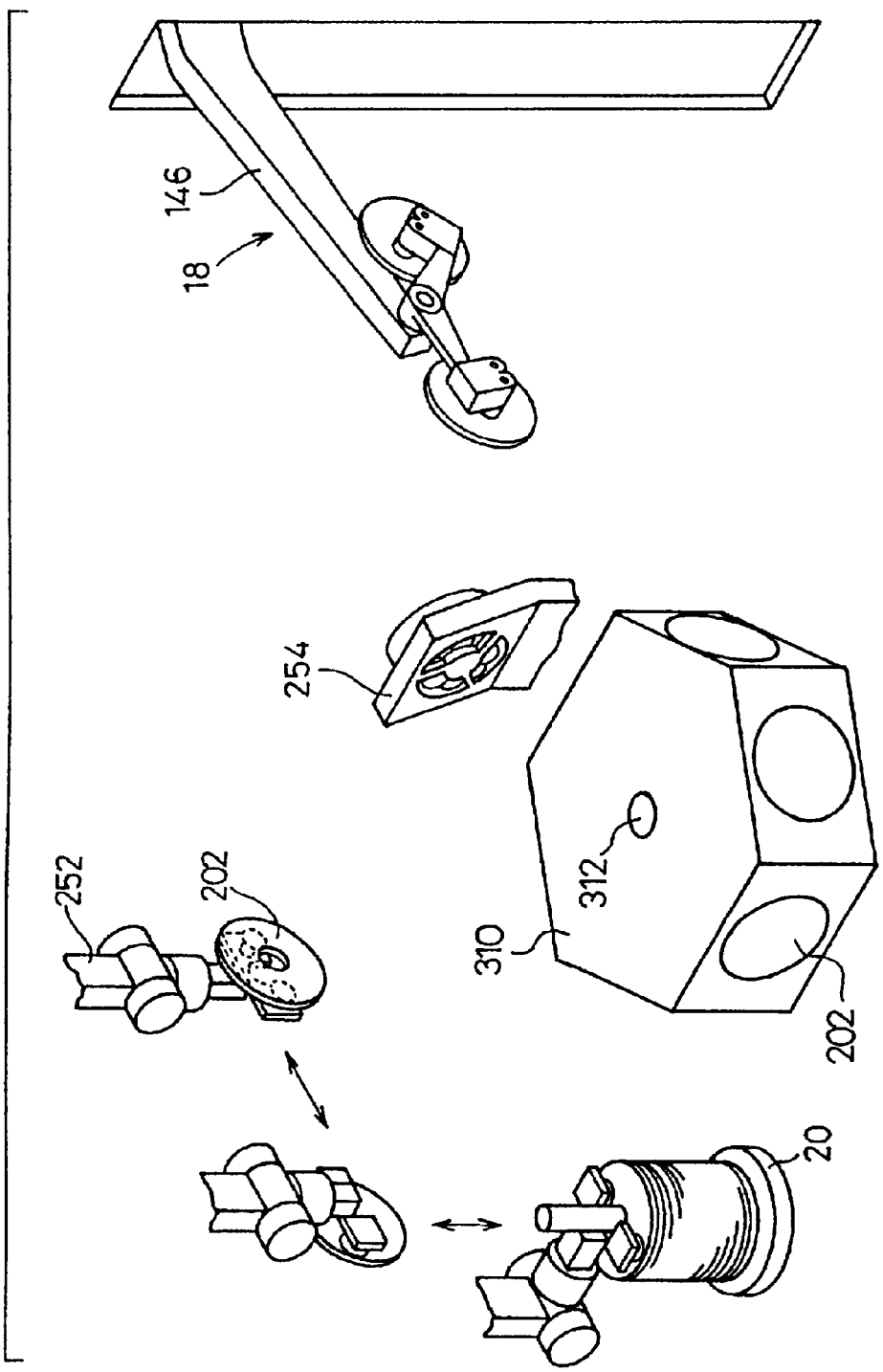
FIG. 14 is a perspective view of a feed mechanism according to a third modification in the cooling apparatus used in the cooling process in the method according to the first embodiment.

FIG. 14 shows a feed mechanism in the form of a heptagonal prism for attracting substrates to respective outer facets under vacuum thereon according to a third modification. In FIG. 14, the outer facets of a heptagonal prism 310 are connected to a vacuum device (not shown). When the vacuum device is operated, a plurality of substrates 202 are attracted to the respective outer facets under vacuum.

Two simultaneously molded substrates 202 are alternately attracted to outer facets of the heptagonal prism 310 under vacuum. The heptagonal prism 310 has a central shaft 312 directly coupled to the rotatable shaft of a drive motor (not shown). When the drive motor is energized, the heptagonal prism 310 is rotated to feed the substrates 202 attracted to the respective outer facets in one direction.

The first through third modifications described above can be used in production systems 510, 610 according to second and third embodiments of the present invention, as described later on.

A projection system 510 according to a second embodiment of the present invention will be described below with reference to FIG. 15. Those mechanisms and parts of the projection system 510 which are identical to those of the projection system 10 according to the first embodiment are denoted by identical reference characters, and will not be described later on.

Figure 15:
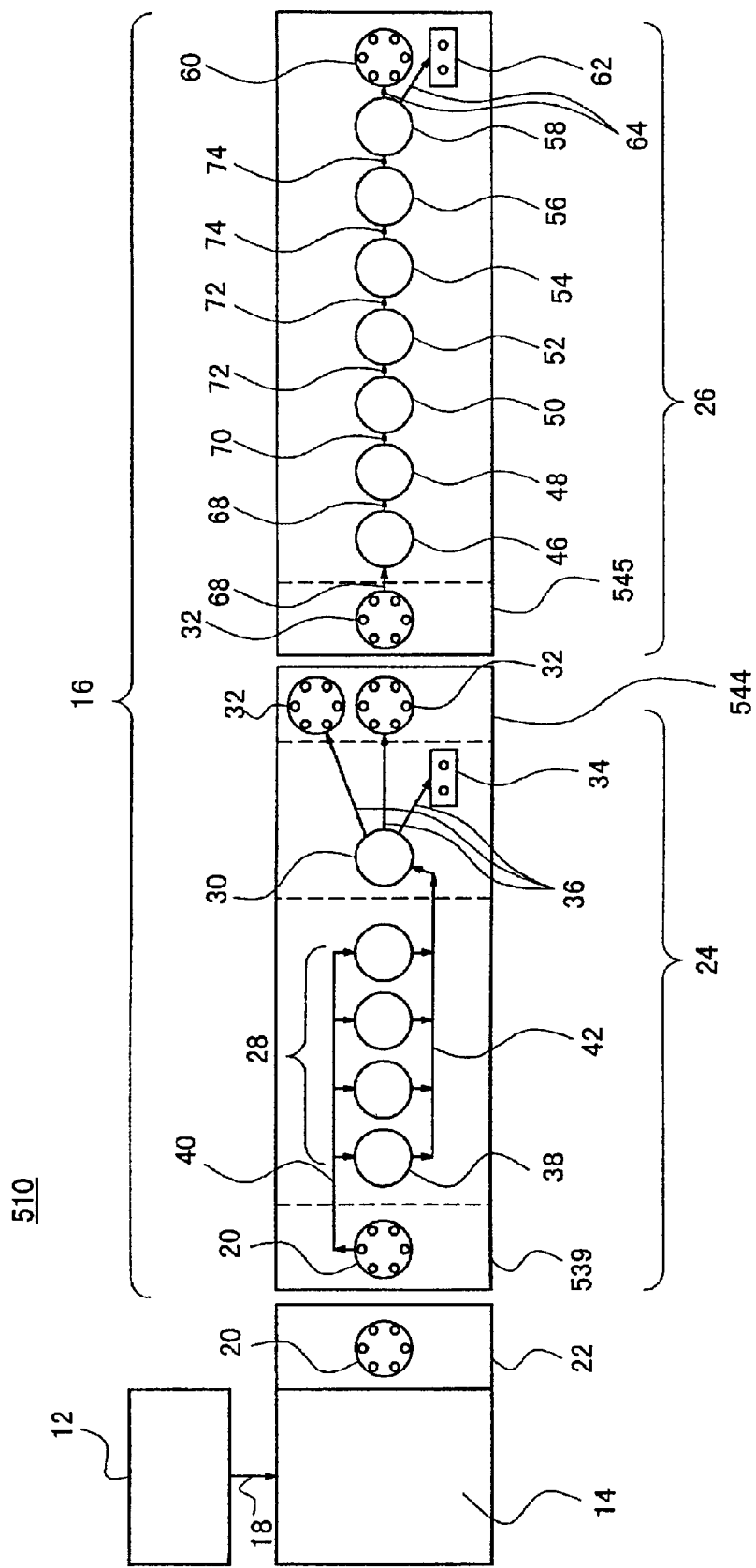
FIG. 15 is a schematic plan view of a production system for carrying out a method of manufacturing an information recording medium according to a second embodiment of the present invention.

As shown in FIG. 15, the projection system 510 according to the second embodiment is of substantially the same structure as the projection system 10 according to the first embodiment, but differs therefrom in that the stack unit 22 and the production assembly 16 are spaced from each other and that the first processing station 24 and the second processing station 26 are spaced from each other.

In the projection system 510 according to the second embodiment, when a predetermined number of substrates 202 are stacked on the stack pole 20 which is disposed in the stack unit 22 that precedes the production assembly 16, the stack pole 20 is removed from the stack unit 22 and fed to the first processing station 24, and placed in a stack pole storage unit 539 in the first processing station 24. The stack pole 20 may be fed by a carriage or a self-propelled feed unit.

When a predetermined number of substrates 202 are stacked on the stack pole 32 which is disposed in a second stack unit 544 in the first processing station 24, the stack pole 32 is removed from the second stack unit 544 and fed to the second processing station 26, and placed in a stack pole storage unit 545 in the second processing station 26. The stack pole 32 may be fed by a carriage or a self-propelled feed unit.

A projection system 610 according to a third embodiment of the present invention will be described below with reference to FIGS. 16 and 17. Those mechanisms and parts of the projection system 610 which are identical to those of the projection system 10 according to the first embodiment are denoted by identical reference characters, and will not be described later on.

Figure 16:
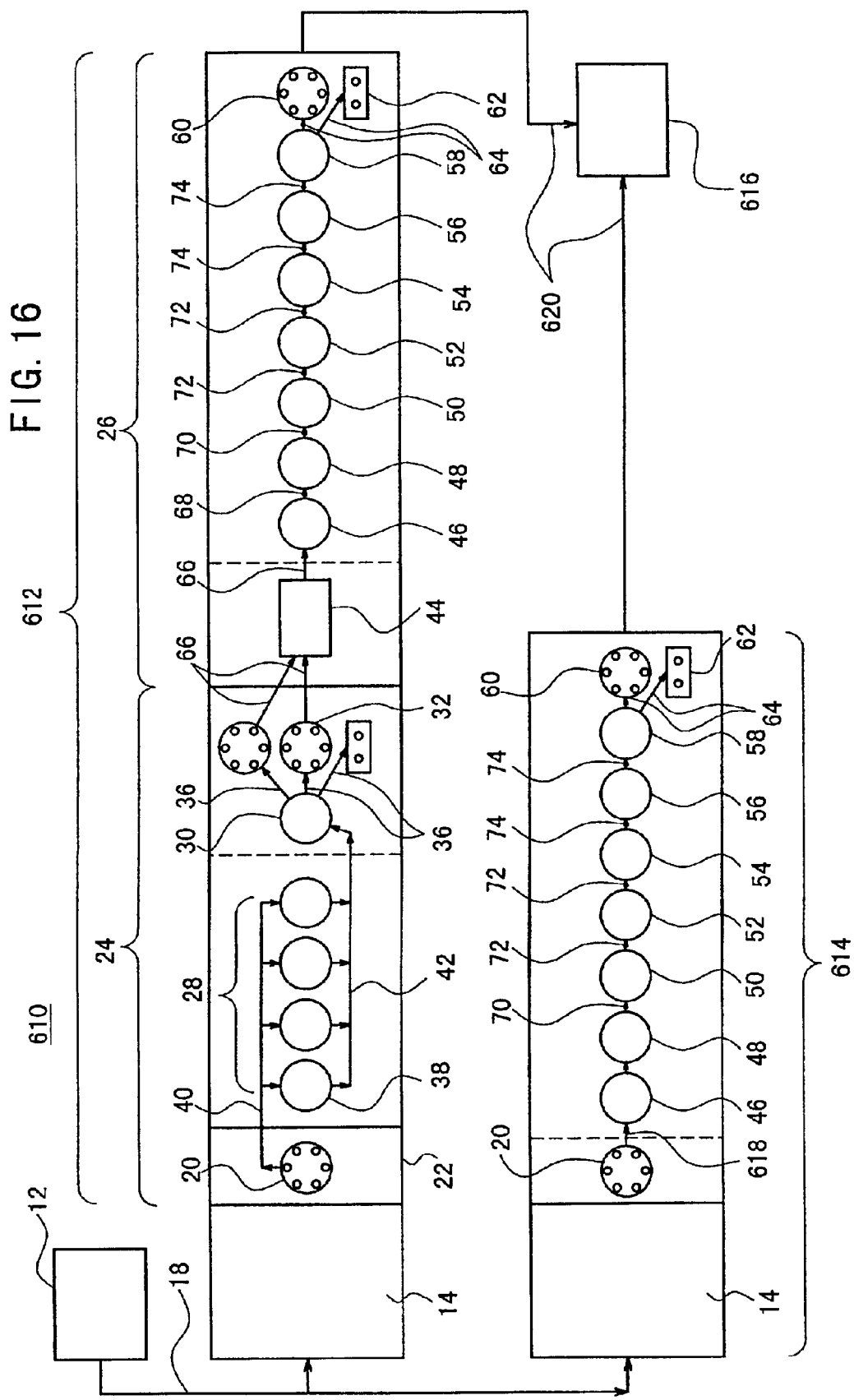
FIG. 16 is a schematic plan view of a production system for carrying out a method of manufacturing an information recording medium according to a third embodiment of the present invention.
Figure 17:
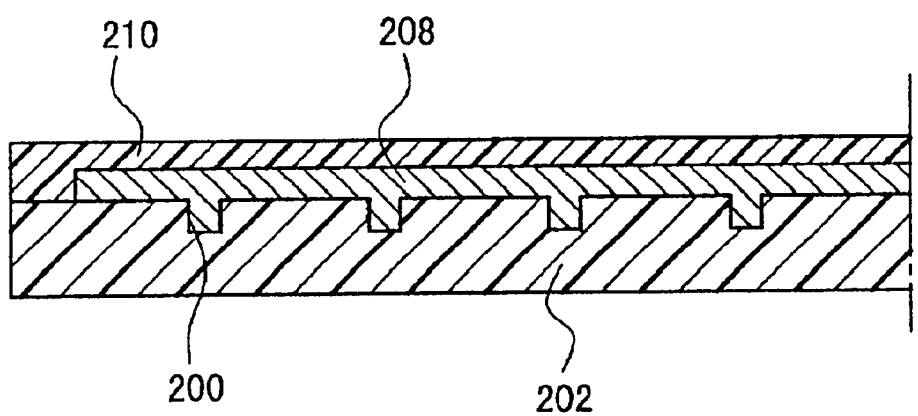
FIG. 17 is a fragmentary cross-sectional view of a substrate with a light reflecting layer and a protective layer disposed thereon.

As shown in FIG. 16, the projection system 610 according to the third embodiment has first and second projection lines 612, 614 for independently processing two simultaneously injection-molded substrates 202, and a bonding mechanism 616 for bonding two substrates 202 processed by the first and second projection lines 612, 614 to each other such that their information recording surfaces face each other.

The second production line 614 has an eighth feed mechanism 618 for taking one at a time of substrates 202 stacked on the stack pole 20 in the stack unit (stack pole rotary table) 22 and feeding the substrate 202 to the sputtering mechanism 46.

The first and second projection lines 612, 614 are followed by a ninth feed mechanism 620 for feeding the substrate 202 processed by the first production line 612 and the substrate 202 processed by the second production line 614 to the bonding mechanism 616.

A production process carried out by the projection system 610 according to the third embodiment will be described below.

Two substrates 202 that are simultaneously fabricated by the injection molding apparatus 12 are fed respectively to the first production line 612 and the second production line 614 by the arm mechanism 18.

The substrate 202 fed to the first production line 612 is processed according to a process including the formation of a dye recording layer. The substrate 202 fed to the second production line 614 is processed according to a process which does not include the formation of a dye recording layer.

The substrate 202 (see FIG. 11B) processed by the first production line 612 and the substrate 202 (see FIG. 17) processed by the second production line 614 are fed to the bonding mechanism 616 by the ninth feed mechanism 620. The bonding mechanism 616 bonds the substrates 202 to each other such that their information recording surfaces face each other, thus completing an information recording medium. The two substrates 202 bonded by the bonding mechanism 616 are then delivered to the non-illustrated label printing process.

In the projection system 610 according to the third embodiment, as described above, two substrates 202 are simultaneously injection-molded, and a dye recording layer is formed on one of the substrates 202 only. Thereafter, the two substrates 202 are bonded to each other. Therefore, the temperatures of the two substrates 202 are made substantially equal to each other, and the resultant information recording medium is stable and free from mechanical fluctuations such as warpage and swaying. The information recording medium can thus be produced with an increased yield.

Although certain preferred embodiments of the present invention have been shown and described in detail, it should be understood that various changes and modifications may be made therein without departing from the scope of the appended claims.

What is claimed is:

1. A method of manufacturing an information recording medium having a substrate produced by injection molding, and a dye recording layer disposed on said substrate for recording information therein, comprising:

simultaneously iniection-molding two substrates;

alternately arranging said two substrates on one feed mechanism; and cooling said two substrates on said feed mechanism, wherein said information recording medium is manufactured by a manufacturing line comprising:

a single injection molding apparatus for simultaneously injection-molding said two substrates; and four dye solution coating machines, wherein each of said dye solution coating machines forms said dye recording layer.

2. A method according to claim 1, further comprising the step of:

supporting the injection molded substrates with surfaces thereof oriented substantially vertically on a feed screw mechanism.

3. A method according to claim 1, further comprising the step of:

supporting the injection molded substrates flatwise on a rotary table.

4. A method according to claim 1, further comprising the step of:

supporting the injection molded substrates with surfaces thereof oriented substantially vertically in a rotatable cylinder.

5. A method according to claim 1, further comprising the step of:

supporting the injection molded substrates on a rotatable polygonal prism with outer facets thereof attracting the substrates, respectively.

* * * * *